US007494537B2

(12) United States Patent
Ono et al.

(10) Patent No.: US 7,494,537 B2
(45) Date of Patent: Feb. 24, 2009

(54) THERMOCHROMIC COLORING COLOR-MEMORY COMPOSITION AND THERMOCHROMIC COLORING COLOR-MEMORY MICROCAPSULE PIGMENT CONTAINING THE SAME

(75) Inventors: Yoshiaki Ono, Nagoya (JP); Katsuyuki Fujita, Nagoya (JP)

(73) Assignee: The Pilot Ink Co., Ltd., Aichi (JP)

( * ) Notice: Subject to any disclaimer, the term of this patent is extended or adjusted under 35 U.S.C. 154(b) by 641 days.

(21) Appl. No.: 11/273,080

(22) Filed: Nov. 15, 2005

(65) Prior Publication Data

US 2006/0112851 A1 Jun. 1, 2006

(30) Foreign Application Priority Data

Nov. 15, 2004 (JP) ............................ 2004-330064
Dec. 8, 2004 (JP) ............................ 2004-356016

(51) Int. Cl.
*C09D 11/00* (2006.01)

(52) U.S. Cl. ............... 106/31.16; 106/31.32; 106/31.64

(58) Field of Classification Search .............. 106/31.16, 106/31.32, 31.64
See application file for complete search history.

(56) References Cited

U.S. PATENT DOCUMENTS

| | | | | |
|---|---|---|---|---|
| 4,720,301 | A | 1/1988 | Kito et al. | |
| 4,961,972 | A * | 10/1990 | Shimizu et al. | 427/388.1 |
| 6,048,387 | A * | 4/2000 | Shibahashi et al. | 106/31.21 |
| 6,770,125 | B2 * | 8/2004 | Chen et al. | 106/31.18 |

FOREIGN PATENT DOCUMENTS

| | | |
|---|---|---|
| EP | 0 873 881 A1 | 10/1998 |
| EP | 1 477 320 A2 | 11/2004 |

OTHER PUBLICATIONS

European Search Report dated Jul. 3, 2006.

* cited by examiner

*Primary Examiner*—J. A. Lorengo
*Assistant Examiner*—Veronica Faison Gee
(74) *Attorney, Agent, or Firm*—Sughrue Mion, PLLC

(57) ABSTRACT

A thermochromic coloring color-memory composition comprising a homogeneous solubilized mixture of (A) an electron donative coloring organic compound, (B) an electron accepting compound and (C) a compound represented by the specific formula as a reaction medium which controls color reactions of the components (A) and (B).

8 Claims, 1 Drawing Sheet

THERMOCHROMIC COLORING COLOR-MEMORY COMPOSITION AND THERMOCHROMIC COLORING COLOR-MEMORY MICROCAPSULE PIGMENT CONTAINING THE SAME

FIELD OF THE INVENTION

This invention relates to a thermochromic coloring color-memory composition and a thermochromic coloring color-memory microcapsule pigment containing the same. More specifically, it relates to a thermochromic coloring color-memory composition which displays reversible discoloration between coloring and decoloring by showing a large hysteresis characteristic based on a change in temperature and keeps either of the colored state and decolored state alternately and reversibly even after removal of application of the heat or cold required for the discoloration, and to a thermochromic coloring color-memory microcapsule pigment containing the same.

BACKGROUND ART

The applicant has already proposed such a type of thermochromic coloring color-memory material (U.S. Pat. No. 4,720,301).

Conventional reversible thermal discoloration materials discolor with a discoloration temperature as a border. Only one specified state of both states before and after discoloration exists within a normal temperature range, and the other state is maintained while a heat or cold necessary for expressing the state is applied but returns to the state of normal temperature range when application of the heat or cold is removed. In comparison with such a type, the above-described thermochromic coloring color-memory material can selectively maintain, within a normal temperature range, either of the color on the side lower than the discoloration temperature and the color on the side higher than that and can alternately maintain the color by applying a heat or cold as needed. It is therefore used in various fields such as temperature-sensitive recording materials, toys, ornaments and printing.

SUMMARY OF THE INVENTION

As is disclosed in the above-described U.S. Pat. No. 4,720,301, such a kind of color memorizing effect is produced only in a system for which, among compounds selected from esters that control the color reaction, a specified compound is used as a constituting component.

The invention contemplates further searching for compounds serving as a reaction medium useful for producing the above-described color-memorizing effect in order to enable more free selection of the reaction medium and further promotion of the use of such a kind of thermochromic coloring color-memory material.

Finding that a system using, as a reaction medium for color reaction, a compound having a specific structure shows a thermal discoloration characteristic with a large maximum hysteresis width (ΔH) and produces an effective color-memorizing effect, the present inventors have completed the present invention.

A requirement of the invention is a thermochromic coloring color-memory composition which comprises a homogeneous solubilized mixture of (A) an electron donative coloring organic compound, (B) an electron accepting compound and (C) a compound represented by the following formula (I) or the following formula (II) as a reaction medium which controls color reactions of the components (A) and (B):

(I)

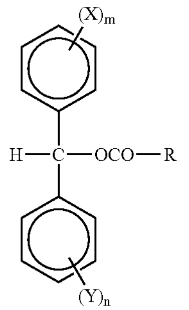

wherein, R represents an alkyl group or alkenyl group, having 8 or more carbon atoms, m and n each represents an integer of from 1 to 3, X and Y each represents a hydrogen atom, $C_{1-4}$ alkyl group, $C_{1-4}$ alkoxy group or halogen:

(II)

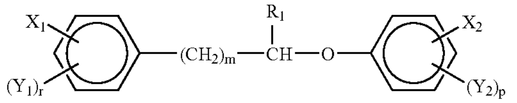

wherein, $R_1$ represents a hydrogen atom or methyl group, m represents an integer of from 0 to 2, either one of $X_1$ and $X_2$ represents $—(CH_2)_nOCOR_2$ or $—(CH_2)_nCOOR_2$ and the other one represents a hydrogen atom, n represents an integer of from 0 to 2, $R_2$ represents an alkyl or alkenyl group, having 4 or more carbon atoms, $Y_1$ and $Y_2$ each represents a hydrogen atom, $C_{1-4}$ alkyl group, methoxy group or halogen, r and p each represents an integer of from 1 to 3, with the proviso that a compound represented by the following formula (III) is excluded from the component (C):

(III)

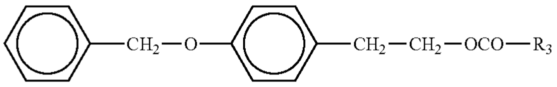

wherein $R_3$ represents an alkyl or alkenyl group, having 4 or more carbon atoms.

Its another requirement is a thermochromic coloring color-memory microcapsule pigment which comprises the above-described thermochromic coloring color-memory composition.

Still another requirement is the above-described thermochromic coloring color-memory microcapsule pigment, wherein the pigment discolors while showing a maximum hysteresis width of from 8° C. to 70° C. regarding a color density-temperature curve.

Still another requirement is the above-described thermochromic coloring color-memory microcapsule pigment which has a complete decoloring temperature ($T_4$) of 40° C. or higher and a coloring starting temperature ($T_2$) of 20° C. or lower, and wherein said pigment has color-memory ability at the ordinary temperature range.

The invention makes it possible to cause reversible discoloration of coloring and decoloring with a broad maximum hysteresis width (ΔH) in a color density-temperature curve, alternately memorize and keep both of the color on the low temperature side and the color on the high temperature side with the discoloration temperature as a border, and effectively produce a characteristic in that either of the colors can be reversibly reproduced, memorized and maintained by applying a heat or cold as needed so that a thermochromic coloring color-memory composition having applicability to various fields such as thermo-color materials, ornaments, toys and training elements and a thermochromic coloring color-memory microcapsule pigment containing the composition can be provided.

In Figs, sign $T_1$ is a complete coloring temperature, sign $T_2$ is a coloring starting temperature, sign $T_3$ is a decoloring starting temperature, sign $T_4$ is a complete decoloring temperature, sign ΔH is a maximum hysteresis width.

DETAILED DESCRITION OF THE INVENTION

Hysteresis characteristic in a color density-temperature curve of the thermochromic coloring color-memory composition and thermochromic coloring color-memory microcapsule pigment using the same according to the invention will next be described based on the graph of FIG. 1.

Figure 1:
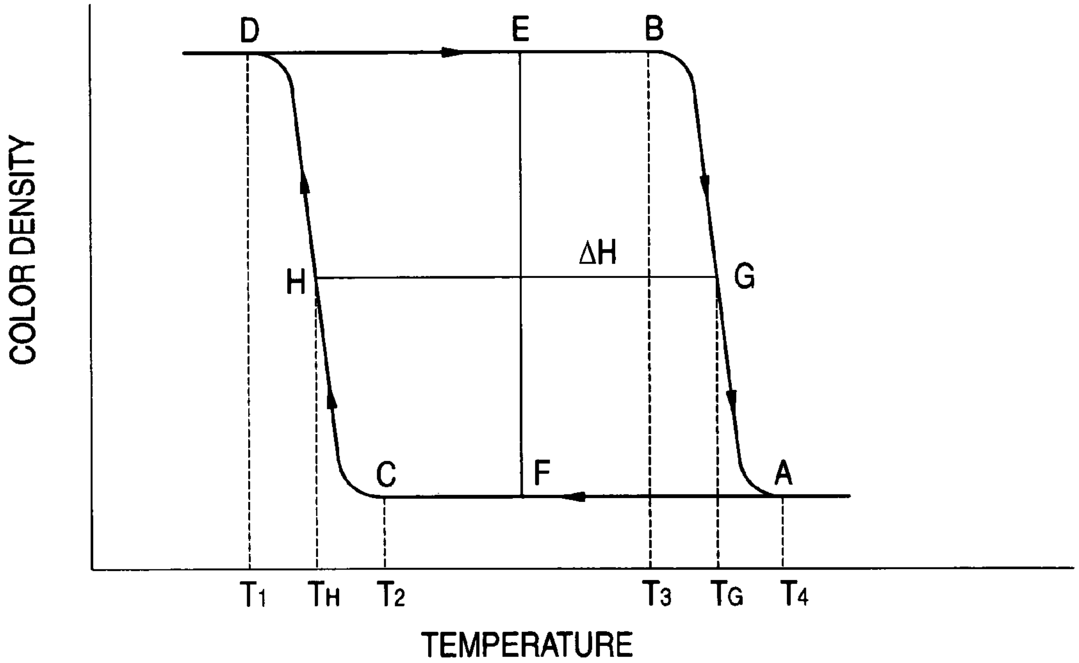
FIG. 1 is a graph for explaining a hysteresis characteristic of the thermochromic coloring color-memory composition of the present invention in a color density-temperature curve.

In FIG. 1, the color density is plotted on the ordinate and the temperature on the abscissa. A change in the color density due to a temperature change progresses along the arrow. On this graph, A is a point showing the density at a temperature $T_4$ at which a decolored state reaches a completely decolored state (which will hereinafter be called "complete decoloring temperature"), B is a point showing the density at a temperature $T_3$ at which a completely colored state can be maintained (which will hereinafter be called "decoloring starting temperature"), C is a point showing the density at a temperature $T_2$ at which a completely decolored state can be maintained (which will hereinafter be called "coloring starting temperature"), and D is a point showing the density at a temperature $T_1$ at which a colored state reaches a completely colored state (which will hereinafter be called "complete coloring temperature").

The discoloration temperature region is a temperature region between the $T_1$ and $T_4$ wherein two phases of the colored state and decolored state can coexist, while the temperature region between $T_2$ and $T_3$ which has a large difference in the color density is a substantial discoloration temperature region (two phase retention region).

The length of the line segment EF is a measure showing contrast of discoloration, and the length of the line segment HG is a temperature width showing the degree of hysteresis (which will hereinafter be called "maximum hysteresis width ΔH"). The larger ΔH value facilitates keeping of each state of before and after discoloration.

The ΔH value permitting retention of each state of before and after discoloration falls within a temperature range of from 8° C. to 70° C. Here, Δt which is a difference between $T_4$ and $T_3$ or a difference between $T_2$ and $T_1$ is a measure for showing sensibility of the discoloration and a range of from 1° C. to 10° C. is suited for practical use.

In addition, in order to allow only one specified state of both states before and after discoloration to exist at a normal temperature range, the complete decoloring temperature ($T_4$) is 40° C. or higher, preferably 45° C. or higher, more preferably 50° C. or higher, and the coloring starting temperature ($T_2$) is 20° C. or lower, preferably 10° C. or lower, more preferably 0° C. or lower.

Although the ratio of the three constituting components (A), (B) and (C) of the invention depends on the concentration, discoloration temperature, discoloration mode and kind of each component, the component ratio of the components (A), (B) and (C) at which desired characteristics can be obtained is component (B) within the range of from 0.1 to 50, preferably from 0.5 to 20, and component (C) within the range of from 1 to 800, preferably from 5 to 200, based on component (A) 1 (each of the above-described ratios is part(s) by weight).

Each component may be a mixture of two or more species, and additives such as antioxidant, ultraviolet absorbent, infrared absorbent and solubilizing agent can be added thereto within a scope not damaging its function.

It is also possible to cause a color change from color [1] to color [2] by incorporating an ordinarily employed pigment (non thermochromic).

Compounds of the components (A), (B) and (C) will next be exemplified specifically.

As the component (A) of the invention, namely an electron donative coloring organic compound, conventionally known compounds such as diphenylmethane phthalides, phenylindolyl phthalides, indolyl phthalides, diphenylmethane azaphthalides, phenylindolyl azaphthalides, fluorans, styrylquinolines and diazarhodamine lactones can be exemplified, and examples of these compounds are shown below.

Examples include 3,3-bis(p-dimethylaminophenyl)-6-dimethylaminophthalide, 3-(4-diethylaminophenyl)-3-(1-ethyl-2-methylindol-3-yl)phthalide, 3,3-bis(1-n-butyl-2-methylindol-3-yl)phthalide, 3,3-bis(2-ethoxy-4-diethylaminophenyl)-4-azaphthalide, 3-[2-ethoxy-4-(N-ethylanilino)phenyl]-3-(1-ethyl-2-methylindol-3-yl)-4-azaphthalide, 3,6-diphenylaminofluoran, 3,6-dimethoxyfluoran, 3,6-di-n-butoxyfluoran, 2-methyl-6-(N-ethyl-N-p-tolylamino)fluoran, 3-chloro-6-cyclohexylaminofluoran, 2-methyl-6-cyclohexylaminofluoran, 2-(2-chloroanilino)-6-di-n-butylaminofluoran, 2-(3-trifluoromethylanilino)-6-diethylaminofluoran, 2-(N-methylanilino)-6-(N-ethyl-N-p-tolylamino)fluoran, 1,3-dimethyl-6-diethylaminofluoran, 2-chloro-3-methyl-6-diethylaminofluoran, 2-anilino-3-methyl-6-diethylaminofluoran, 2-anilino-3-methyl-6-di-n-butylaminofluoran, 2-xylidino-3-methyl-6-diethylaminofluoran, 1-2-benz-6-diethylaminofluoran, 1,2-benz-6-(N-ethyl-N-isobutylamino)fluoran, 1,2-benz-6-(N-ethyl-N-isoamylamino)fluoran, 2-(3-methoxy-4-dodecoxystyryl)quinoline, spiro[5H-(1)benzopyrano(2,3-d)pyrimidine-5,1'(3'H)isobenzofuran]-3'-one, 2-(diethylamino)-8-(diethylamino)-4-methyl-, spiro[5H-(1)benzopyrano(2,3-d)pyrimidine-5,1'(3'H)isobenzofuran]-3'-one, 2-(di-n-butylamino)-8-(di-n-butylamino)-4-methyl-, spiro[5H-(1)benzopyrano(2,3-d)pyrimidine-5,1'(3'H)isobenzofuran]-3'-one, 2-(di-n-butylamino)-8-(diethylamino)-4-methyl-, spiro[5H-(1)benzopyrano(2,3-d)pyrimidine-5,1'(3'H)isobenzofuran]-3'-one, 2-(di-n-butylamino)-8-(N-ethyl-N-i-amylamino)-4-methyl-, spiro[5H-(1)benzopyrano(2,3-d)pyrimidine-5,1'(3'H)isobenzofuran]-3'-one, 2-(di-n-butylamino)-8-(di-n-butylamino)-4-phenyl, 3-(2-methoxy-4- dimethylaminophenyl)-3-(1-butyl-2-methylindol-3-yl)-4,5,6,7-tetrachlorophthalide, 3-(2-ethoxy-4-diethylaminophenyl)-3-(1-ethyl-2-methylindol-3-yl)-4,5,6,7-tetrachlorophthalide, and 3-(2-ethoxy-4-diethylaminophenyl)-3-(1-pentyl-2-methylindol-3-yl)-4,5,6,7-tetrachlorophthalide.

Additional examples include pyridine, quinazoline and bisquinazoline compounds which are effective for producing fluorescent yellow to red colors.

Examples of the electron accepting compound as the component (B) include a group of compounds having active protons, a group of pseudo-acidic compounds (a group of compounds which are not acid but cause color development of the component (A) by acting as acid in the composition) and a group of compounds having electron voids.

The compounds having active protons are, for example, compounds having a phenolic hydroxyl group such as monophenols and polyphenols, these compounds having a substituent such as alkyl group, aryl group, acyl group, alkoxycarbonyl group or carboxy group, ester thereof, amide group or halogen group, bisphenols, trisphenols and phenol-aldehyde condensed resins. They may also be metal salts of the above-described compounds having a phenolic hydroxyl group.

The specific examples include:

phenol, o-cresol, tertiary butyl catechol, nonylphenol, n-octylphenol, n-dodecylphenol, n-stearylphenol, p-chlorophenol, p-bromophenol, o-phenylphenol, n-butyl p-hydroxybenzoate, n-octyl p-hydroxybenzoate, resorcin, dodecyl gallate, 2,2-bis(4-hydroxyphenyl)propane, 4,4-dihydroxydiphenylsulfone, 1,1-bis(4-hydroxyphenyl) ethane, 2,2-bis(4-hydroxy-3-methylphenyl)propane, bis(4-hydroxyphenyl) sulfide, 1-phenyl-1,1,-bis(4-hydroxyphenyl) ethane, 1,1-bis(4-hydroxyphenyl)-3-methylbutane, 1,1-bis (4-hydroxyphenyl)-2-methylpropane, 1,1-bis(4-hydroxyphenyl)-n-hexane, 1,1-bis(4-hydroxyphenyl)-n-heptane, 1,1-bis(4-hydroxyphenyl)-n-octane, 1,1-bis(4-hydroxyphenyl)-n-nonane, 1,1-bis(4-hydroxyphenyl)-n-decane, 1,1-bis(4-hydroxyphenyl)-n-dodecane, 2,2-bis(4-hydroxyphenyl)butane, 2,2-bis(4-hydroxyphenyl)ethyl propionate, 2,2-bis(4-hydroxyphenyl)-4-methylpentane, 2,2-bis(4-hydroxyphenyl)hexafluoropropane, 2,2-bis(4-hydroxyphenyl)-n-heptane and 2,2-bis(4-hydroxyphenyl)-n-nonane.

When a compound having at least 3 benzene rings and also having a phenolic hydroxyl group with a molecular weight of 250 or more, preferably from 250 to 500, or a compound having a phenolic hydroxyl group and represented by the below-described formula (IV) is used as the above-described compound having a phenolic hydroxyl group, discoloration sensitivity in changing from a decolored state to a colored state can be increased further.

Figure 2:
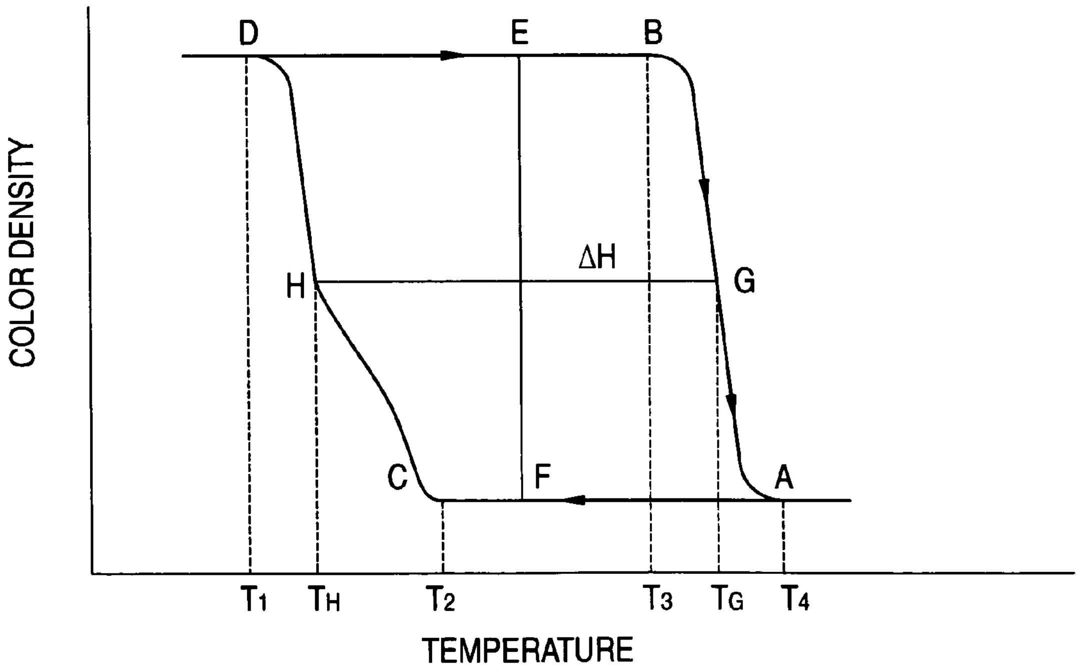
FIG. 2 is a graph for explaining a hysteresis characteristic of the thermochromic coloring color-memory composition of the present invention in a color density-temperature curve.

More specifically, in the discoloration behavior starting from the temperature ($T_4$) at which a completely decolored state appears and ending at the temperature ($T_1$) at which a completely colored state appears via the temperature ($T_2$) at which color development starts, use of such a compound does not permit gradual coloring behavior which will otherwise occur by the shifting of the temperature ($T_2$) at which color development starts to the high temperature side as illustrated in FIG. 2, but facilitates quick shifting behavior from the decolored state to the colored state owing to a small temperature difference between the temperature ($T_2$) at which color development starts and the temperature ($T_1$) at which a completely colored state appears as illustrated in FIG. 1.

(IV)

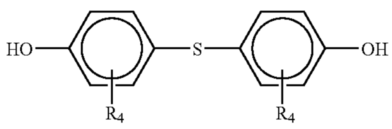

In the formula (IV), $R_4$ represents a $C_{1-8}$ alkyl group.

Examples of the above-described compound having at least 3 benzene rings and also having a phenolic hydroxyl group with a molecular weight of 250 or more include:

4,4',4"-methylidenetrisphenol,
2,6-bis[(2-hydroxy-5-methylphenol)methyl]-4-methylphenol,
4,4'-[1-[4-[1-(4-hydroxyphenyl)-1-methylethyl]phenyl]ethylidene]bisphenol,
4,4',4"-methylidenetris[2-methylphenol],
4,4'-[(2-hydroxyphenyl)methylene]bis[2,3,6-triphenylphenol],
2,2-methylenebis[6-[(2-hydroxy-5-methylphenyl)methyl]-4-methylphenol],
2,4,6-tris(4-hydroxyphenylmethyl)1,3-benzenediol,
4,4',4"-ethylidenetrisphenol,
4,4'-[(4-hydroxyphenyl)methylene]bis[2-methylphenol],
4,4-[(4-hydroxyphenyl)methylene]bis[2,6-dimethylphenol],
4,4'-[(4-hydroxyphenyl)methylene]bis[2-methylphenol],
4,4'-[(4-hydroxyphenyl)methylene]bis[2,6-dimethylphenol],
4,4'-[(4-hydroxy-3-methoxyphenyl)methylene]bis[2,6-dimethylphenol],
2,4-bis[(5-methyl-2-hydroxyphenyl)methyl)-6-cyclohexylphenol,
4,4'-[1-[4-[1-(4-hydroxy-3-methylphenol)-1-methylethyl] phenyl]ethylidene]bis[2-methylphenol],
4,4'-[(4-hydroxyphenyl)methylene]bis[2-cyclohexyl-5-methylphenol],
4,6-bis[(4-hydroxyphenyl)methyl]1,3-benzenediol,
4,4'-[(3,4-di-hydroxyphenyl)methylene]bis[2,6-dimethylphenol],
4,4'-(1-phenylethylidene)bisphenol,
5,5'-(1-methylethylidene)bis[1-phenyl-2-ol],
4,4',4"-methylidenetrisphenol,
4,4'-[1-[4-[1-(4-hydroxyphenyl)-1-methylethyl]phenyl]ethylidene]bisphenol,
4,4'-(phenylmethylene)bisphenol,
4,4'-[1,4-phenylenebis(1-methylethylidene)]bis[2-methylphenol], and
5,5'-(1,1-cyclohexylidene)bis[1-biphenyl-2-ol].

Examples of the above-described compound having a phenolic hydroxyl group and represented by the formula (IV) include bis(3-methyl-4-hydroxyphenyl)sulfide, bis(3,5-dimethyl-4-hydroxyphenyl), bis(3-ethyl-4-hydroxyphenyl)sulfide, bis(3,5-diethyl-4-hydroxyphenyl)sulfide, bis(3-propyl-4-hydroxyphenyl)sulfide, bis(3,5-dipropyl-4-hydroxyphenyl)sulfide, bis(3-t-butyl-4-hydroxyphenyl) sulfide, bis(3,5-t-butyl-4-hydroxyphenyl)sulfide, bis(3-pentyl-4-hydroxyphenyl)sulfide, bis(3-hexyl-4-hydroxyphenyl)sulfide, bis(3-heptyl-4-hydroxyphenyl) sulfide and bis(5-octyl-2-hydroxyphenyl)sulfide.

Although the above-described compound having a phenolic hydroxyl group can produce most effective thermal discoloration characteristics, a compound selected from aromatic carboxylic acids, aliphatic carboxylic acids having from 2 to 5 carbon atoms, carboxylic acid metal salts, acidic phosphoric acid esters and metal salts thereof, and 1,2,3-triazole and derivatives thereof may be used instead.

The component (C) represented by the formula (I) will next be described specifically.

Ester compounds represented by the formula (I) are each composed of an alcohol compound having, in the molecule thereof, two aromatic rings and a saturated or unsaturated fatty acid having at least 8 carbon atoms.

In the formula, R represents an alkyl or alkenyl group having at least 8 carbon atoms, preferably a $C_{10-24}$ alkyl group, more preferably a $C_{12-22}$ alkyl group.

Specific examples of the compound include 1,1-diphenylmethyl octanoate, 1,1-diphenylmethyl nonanoate, 1,1-diphenyl decanoate, 1,1-diphenylmethyl undecanoate, 1,1-diphenylmethyl dodecanoate, 1,1-diphenylmethyl tridecanoate, 1,1-diphenylmethyl tetradecanoate, 1,1-diphenylmethyl pentadecanoate, 1,1-diphenylmethyl hexadecanoate, 1,1-diphenylmethyl heptadecanoate, 1,1-diphenylmethyl octadecanoate, 1,1-diphenylmethyl nonadecanoate, 1,1-diphenylmethyl eicosanoate, 1,1-diphenylmethyl tricosanoate, 1,1-diphenylmethyl dodecanoate, 1,1-diphenylmethyl tricosanoate, 1,1-diphenylmethyl tetracosanoate, 1,1-diphenylmethyl pentacosanoate, 1,1-diphenylmethyl hexacosanoate, 1,1-diphenylmethyl heptacosanoate, 1,1-diphenylmethyl octacosanoate, 1,1-diphenylmethyl nonacosanoate, 1,1-diphenylmethyl triacontanoate, 1,1-diphenylmethyl hentriacontanoate, 1,1(4-methylphenyl)methyl decanoate, 1,1(4-methylphenyl)methyl dodecanoate, 1,1(4-methylphenyl)methyl tetradecanoate, 1,1(4-methylphenyl)methyl hexadecanoate, 1,1(4-methylphenyl)methyl octadecanoate, 1,1(4-methylphenyl)methyl eicosanoate, 1,1(4-methylphenyl)methyl docosanoate, 1,1(3-methylphenyl)methyl decanoate, 1,1(3 -methylphenyl)methyl dodecanoate, 1,1(3-methylphenyl)methyl tetradecanoate, 1,1(3-methylphenyl)methyl hexadecanoate, 1,1(3-methylphenyl)methyl octadecanoate, 1,1(3-methylphenyl)methyl eicosanoate, 1,1(3-methylphenyl)methyl docosanoate, 1,1(3,4-dimethylphenyl)methyl decanoate, 1,1(3,4-dimethylphenyl)methyl dodecanoate, 1,1(3,4-dimethylphenyl)methyl tetradecanoate, 1,1(3,4-dimethylphenyl)methyl hexadecanoate, 1,1(3,4-dimethylphenyl)methyl octadecanoate, 1,1(3,4-dimethylphenyl)methyl eicosanoate, 1,1(3,4-dimethylphenyl)methyl docosanoate, 1,1(3-4-5-trimethylphenyl)methyl decanoate, 1,1(3-4-5-trimethylphenyl)methyl dodecanoate, 1,1(3-4-5-trimethylphenyl)methyl tetradecanoate, 1,1(3-4-5-trimethylphenyl)methyl hexadecanoate, 1,1(3-4-5-trimethylphenyl)methyl octadecanoate, 1,1(3-4-5-trimethylphenyl)methyl eicosanoate, 1,1(3-4-5-trimethylphenyl)methyl, 1,1(3-4-5-trimethylphenyl)methyl docosanoate, 1,1(4-ethylphenyl)methyl decanoate, 1,1(4-ethylphenyl)methyl dodecanoate, 1,1(4-ethylphenyl)methyl tetradecanoate, 1,1(4-ethylphenyl)methyl hexadecanoate, 1,1(4-ethylphenyl)methyl octadecanoate, 1,1(4-ethylphenyl)methyl eicosanoate, 1,1(4-ethylphenyl)methyl docosanoate, 1,1(3-ethylphenyl)methyl decanoate, 1,1(3-ethylphenyl)methyl dodecanoate, 1,1(3-ethylphenyl)methyl tetradecanoate, 1,1(3-ethylphenyl)methyl hexadecanoate, 1,1(3-ethylphenyl)methyl octadecanoate, 1,1(3-ethylphenyl)methyl eicosanoate, 1,1(3-ethylphenyl)methyl docosanoate, 1,1(3-4-ethylphenyl)methyl decanoate, 1,1(3-4-ethylphenyl)methyl dodecanoate, 1,1(3-4-ethylphenyl)methyl tetradecanoate, 1,1(3-4-ethylphenyl)methyl hexadecanoate, 1,1(3-4-ethylphenyl)methyl octadecanoate, 1,1(3-4-ethylphenyl)methyl eicosanoate, 1,1(3-4-ethylphenyl)methyl docosanoate, 1,1(4-propylphenyl)methyl decanoate, 1,1(4-propylphenyl)methyl dodecanoate, 1,1(4-propylphenyl)methyl tetradecanoate, 1,1(4-propylphenyl)methyl hexadecanoate, 1,1(4-propylphenyl)methyl octadecanoate, 1,1(4-propylphenyl)methyl eicosanoate, 1,1(4-propylphenyl)methyl docosanoate, 1,1(4-t-butylphenyl)methyl decanoate, 1,1(4-t-butylphenyl)methyl dodecanoate, 1,1(4-t-butylphenyl)methyl tetradecanoate, 1,1(4-t-butylphenyl)methyl hexadecanoate, 1,1(4-t-butylphenyl)methyl octadecanoate, 1,1(4-t-butylphenyl)methyl eicosanoate, 1,1(4-t-butylphenyl)methyl docosanoate, 1,1(3-t-butylphenyl)methyl decanoate, 1,1(3-t-butylphenyl)methyl dodecanoate, 1,1(3-t-butylphenyl)methyl tetradecanoate, 1,1(3-t-butylphenyl)methyl hexadecanoate, 1,1(3-t-butylphenyl)methyl octadecanoate, 1,1(3-t-butylphenyl)methyl eicosanoate, 1,1(3-t-butylphenyl)methyl docosanoate, 1,1(4-methoxyphenyl)methyl decanoate, 1,1(4-methoxyphenyl)methyl dodecanoate, 1,1(4-methoxyphenyl)methyl tetradecanoate, 1,1(4-methoxyphenyl)methyl hexadecanoate, 1,1(4-methoxyphenyl)methyl octadecanoate, 1,1(4-methoxyphenyl)methyl eicosanoate, 1,1(4-methoxyphenyl)methyl docosanoate, 1,1(3-methoxyphenyl)methyl decanoate, 1,1(3-methoxyphenyl)methyl dodecanoate, 1,1(3-methoxyphenyl)methyl tetradecanoate, 1,1(3-methoxyphenyl)methyl hexadecanoate, 1,1(3-methoxyphenyl)methyl octadecanoate, 1,1(3-methoxyphenyl)methyl eicosanoate, 1,1(3-methoxyphenyl)methyl docosanoate, 1,1(4-ethoxyphenyl)methyl decanoate, 1,1(4-ethoxyphenyl)methyl dodecanoate, 1,1(4-ethoxyphenyl)methyl tetradecanoate, 1,1(4-ethoxyphenyl)methyl hexadecanoate, 1,1(4-ethoxyphenyl)methyl octadecanoate, 1,1(4-ethoxyphenyl)methyl eicosanoate, 1,1(4-ethoxyphenyl)methyl docosanoate, 1,1(3-ethoxyphenyl)methyl decanoate, 1,1(3-ethoxyphenyl)methyl dodecanoate, 1,1(3-ethoxyphenyl)methyl tetradecanoate, 1,1(3-ethoxyphenyl)methyl hexadecanoate, 1,1(3-ethoxyphenyl)methyl octadecanoate, 1,1(3-ethoxyphenyl)methyl eicosanoate, 1,1(3-ethoxyphenyl)methyl docosanoate, 1,1(4-propyloxyphenyl)methyl decanoate, 1,1(4-propyloxyphenyl)methyl dodecanoate, 1,1(4-propyloxyphenyl)methyl tetradecanoate, 1,1(4-propyloxyphenyl)methyl hexadecanoate, 1,1(4-propyloxyphenyl)methyl octadecanoate, 1,1(4-propyloxyphenyl)methyl eicosanoate, 1,1(4-propyloxyphenyl)methyl docosanoate, 1,1(4-chlorophenyl)methyl decanoate, 1,1(4-chlorophenyl)methyl dodecanoate, 1,1(4-chlorophenyl)methyl tetradecanoate, 1,1(4-chlorophenyl)methyl hexadecanoate, 1,1(4-chlorophenyl)methyl octadecanoate, 1,1(4-chlorophenyl)methyl eicosanoate, 1,1(4-chlorophenyl)methyl docosanoate, 1,1(3-chlorophenyl)methyl decanoate, 1,1(3-chlorophenyl)methyl dodecanoate, 1,1(3-chlorophenyl)methyl tetradecanoate, 1,1(3-chlorophenyl)methyl hexadecanoate, 1,1(3-chlorophehyl)methyl octadecanoate, 1,1(3-chlorophenyl)methyl eicosanoate, 1,1(3-chlorophenyl)methyl docosanoate, 1,1(3-4-dichlorophenyl)methyl decanoate, 1,1(3-4-dichlorophenyl)methyl dodecanoate, 1,1(3-4-dichlorophenyl)methyl tetradecanoate, 1,1(3-4-dichlorophenyl)methyl hexadecanoate, 1,1(3-4-dichlorophenyl)methyl octadecanoate, 1,1(3-4-dichlorophenyl)methyl eicosanoate, 1,1(3-4-dichlorophenyl)methyl docosanoate, 1,1(4-bromophenyl)methyl decanoate, 1,1(4-bromophenyl)methyl dodecanoate, 1,1(4-bromophenyl)methyl tetradecanoate, 1,1(4-bromophenyl)methyl hexadecanoate, 1,1(4-bromophenyl)methyl octadecanoate, 1,1(4-bromophenyl) methyl eicosanoate, 1,1(4-bromophenyl)methyl docosanoate, 1,1(3-bromophenyl)methyl decanoate, 1,1(3-bromophenyl)methyl dodecanoate, 1,1(3-bromophenyl)methyl tetradecanoate, 1,1(3-bromophenyl)methyl hexadecanoate, 1,1(3-bromophenyl)methyl octadecanoate, 1,1(3-bromophenyl) methyl eicosanoate, 1,1(3-bromophenyl)methyl docosanoate, 1,1(3-4-dibromophenyl)methyl decanoate, 1,1 (3-4-dibromophenyl)methyl dodecanoate, 1,1(3-4-dibromophenyl)methyl tetradecanoate, 1,1(3-4-dibromophenyl) methyl hexadecanoate, 1,1(3-4-dibromophenyl)methyl octadecanoate, 1,1(3-4-dibromophenyl)methyl eicosanoate, 1,1(3-4-dibromophenyl)methyl docosanoate, 1,1(4-fluorophenyl)methyl decanoate, 1,1(4-fluorophenyl)methyl dodecanoate, 1,1(4-fluorophenyl)methyl tetradecanoate, 1,1 (4-fluorophenyl)methyl hexadecanoate, 1,1(4-fluorophenyl) methyl octadecanoate, 1,1(4-fluorophenyl)methyl eicosanoate and 1,1(4-fluorophenyl)methyl docosanoate.

The following are the specific examples of the component (C) represented by the formula (II). Compound numbers are shown in the parentheses, respectively.

(1)

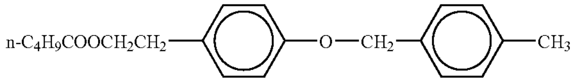

(2)

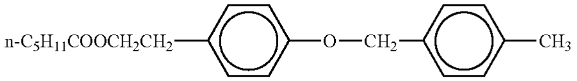

(3)

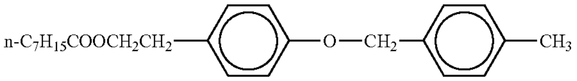

(4)

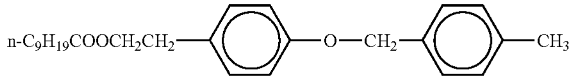

(5)

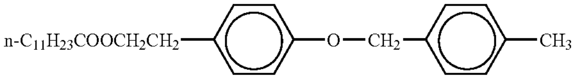

(6)

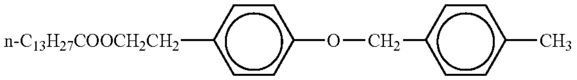

(7)

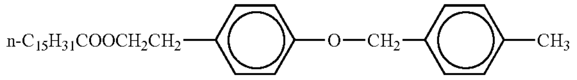

(8)

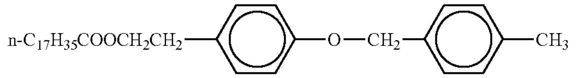

-continued (9)

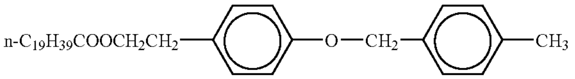

(10)

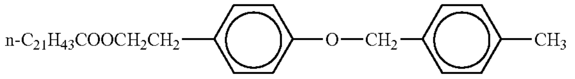

(11)

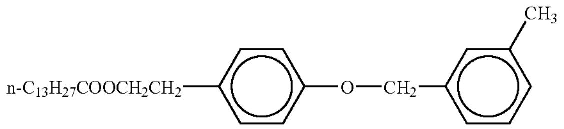

(12)

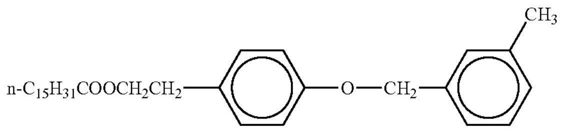

(13)

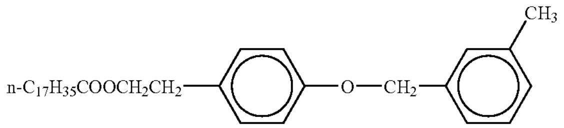

(14)

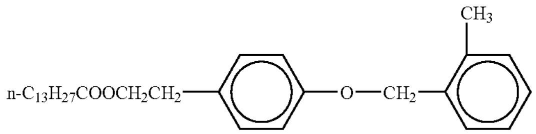

(15)

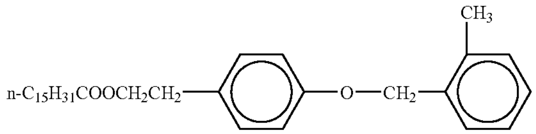

(16)

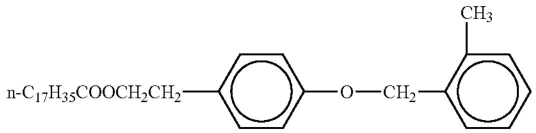

(17)

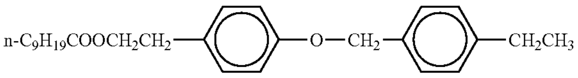

(18)

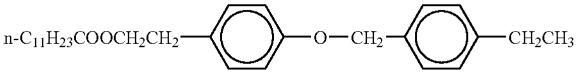

(19)

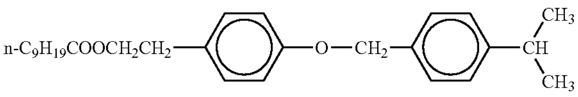

-continued
(20)
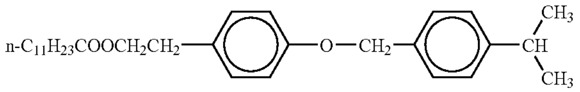
(21)
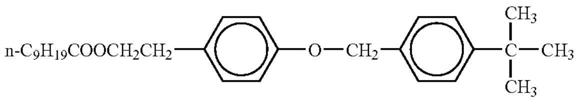
(22)
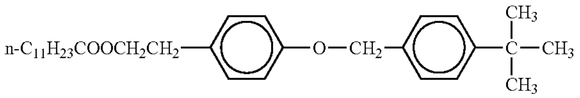
(23)
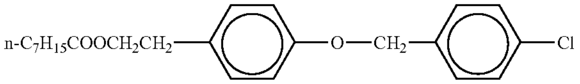
(24)
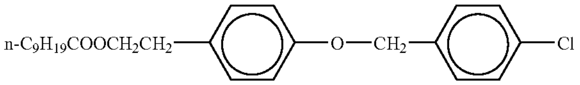
(25)
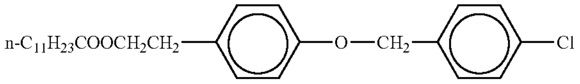
(26)
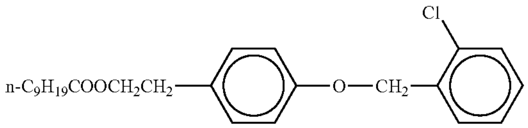
(27)
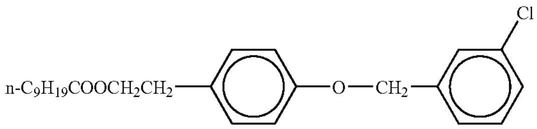
(28)
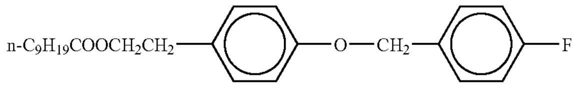
(29)
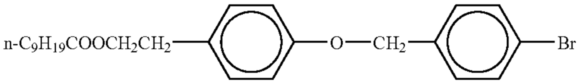
(30)
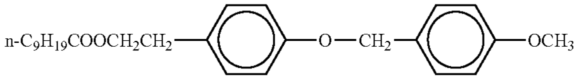
(31)
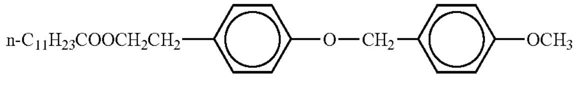
-continued
(32)
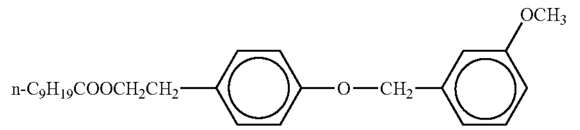
(33)
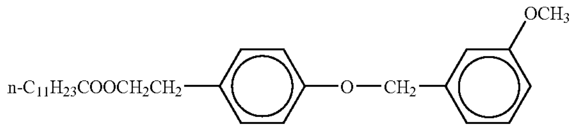
(34)
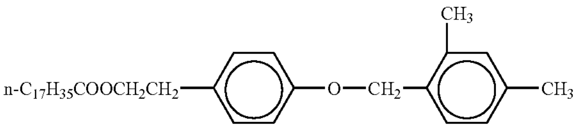
(35)
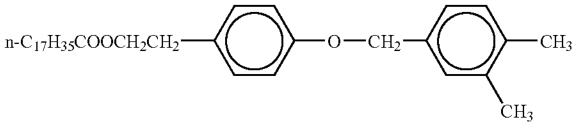
(36)
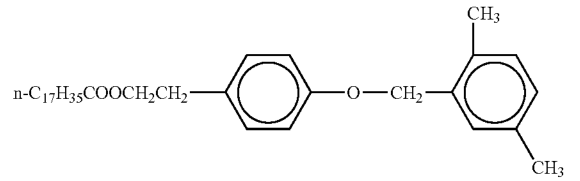
(37)
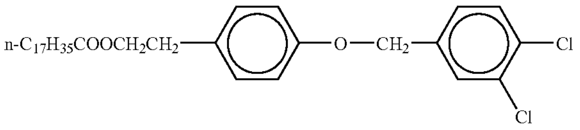
(38)
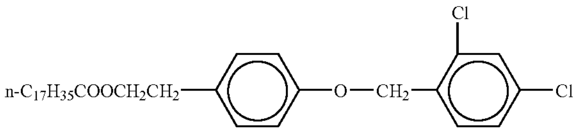
(39)
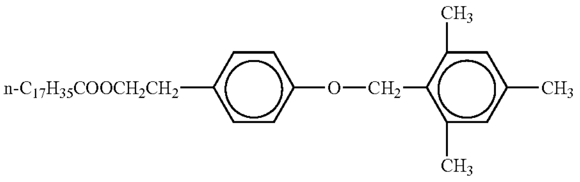
(40)
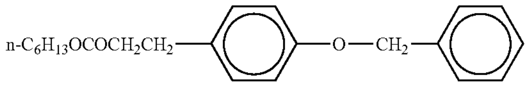
(41)
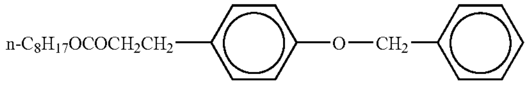

-continued
(42)
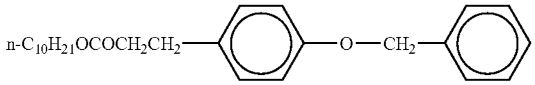
(43)
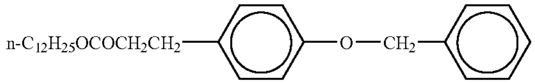
(44)
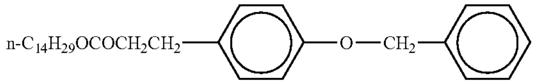
(45)
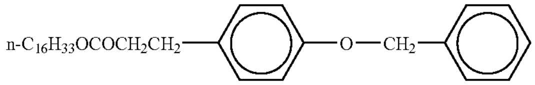
(46)
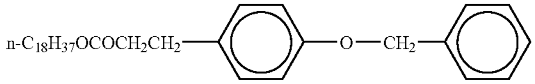
(47)
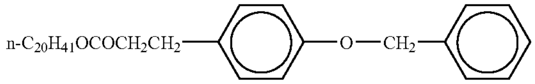
(48)
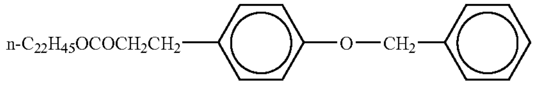
(49)
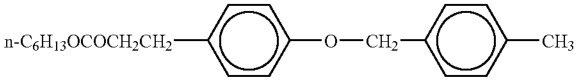
(50)
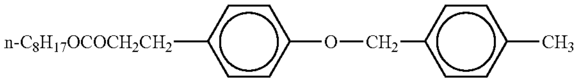
(51)
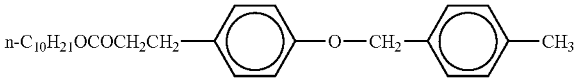
(52)
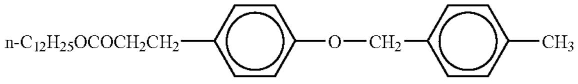
(53)
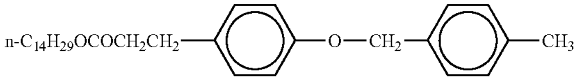
(54)
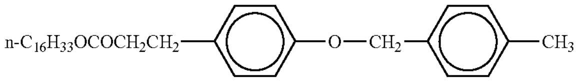
(55)
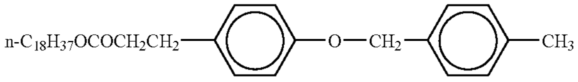
-continued
(56)
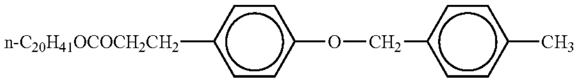
(57)
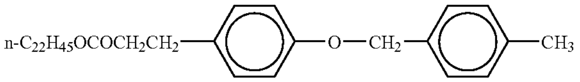
(58)
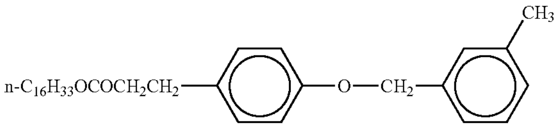
(59)
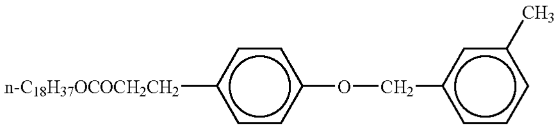
(60)
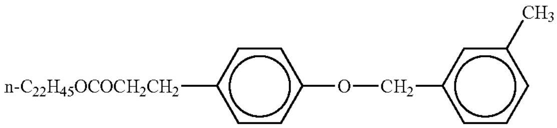
(61)
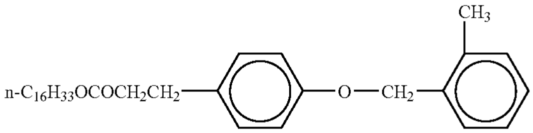
(62)
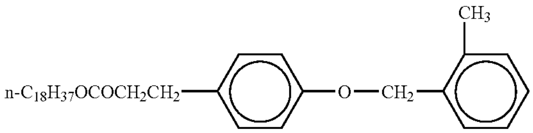
(63)
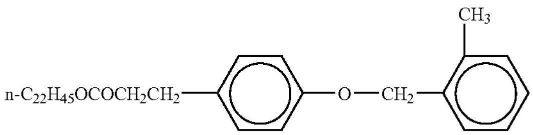
(64)
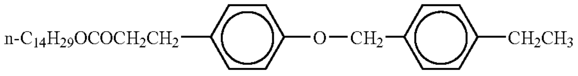
(65)
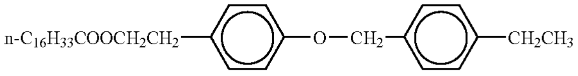
(66)
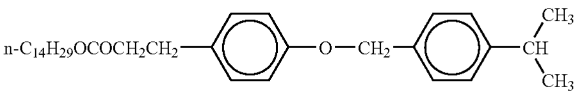

-continued
(67)
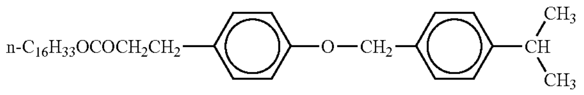
(68)
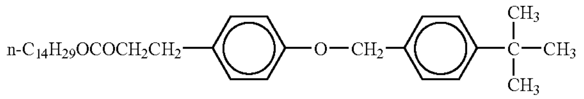
(69)
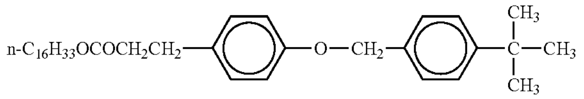
(70)
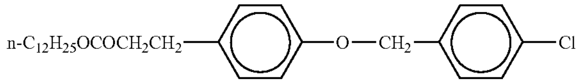
(71)
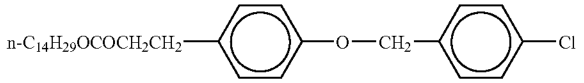
(72)
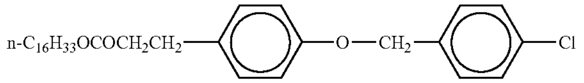
(73)
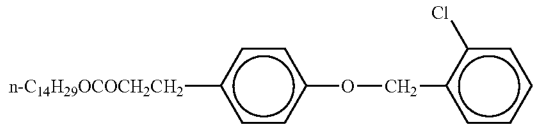
(74)
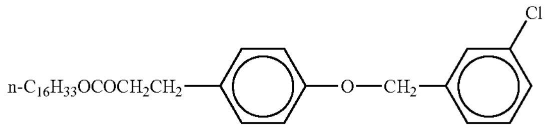
(75)
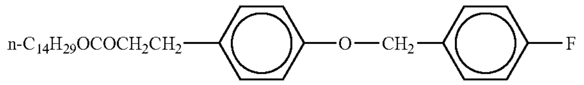
(76)
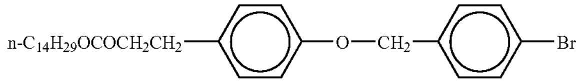
(77)
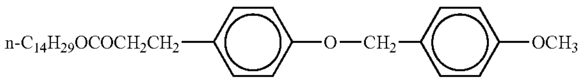
(78)
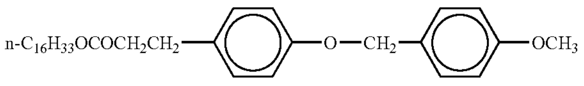
-continued
(79)
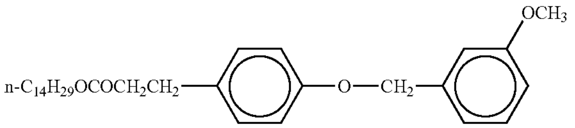
(80)
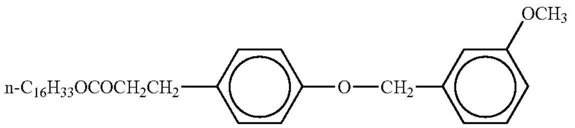
(81)
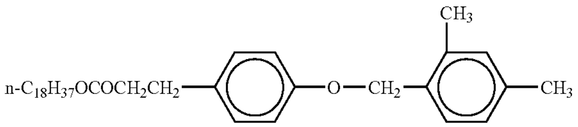
(82)
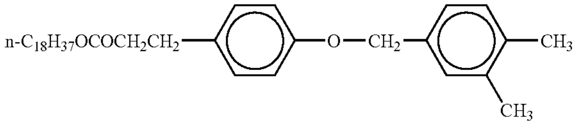
(83)
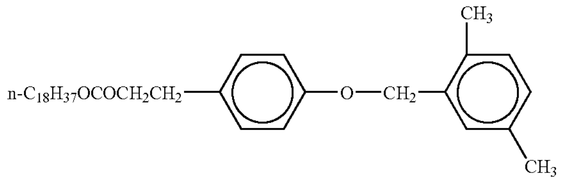
(84)
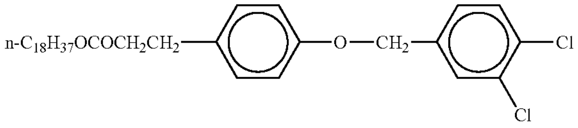
(85)
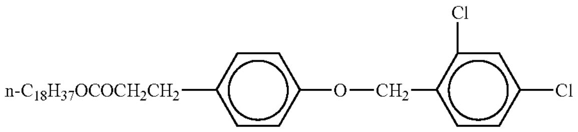
(86)
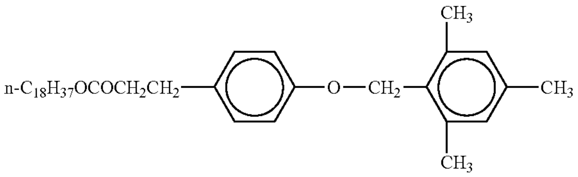
(87)
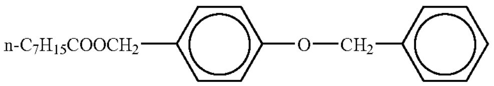
(88)
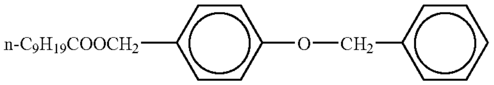

-continued
(89)
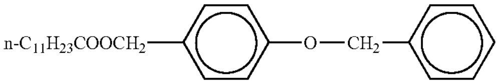
(90)
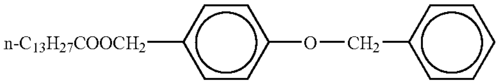
(91)
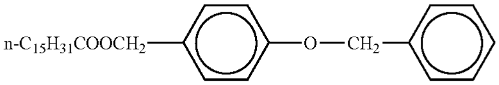
(92)
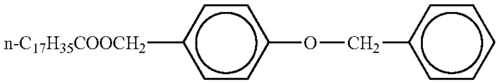
(93)
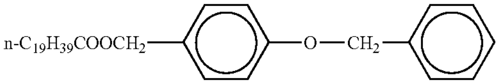
(94)
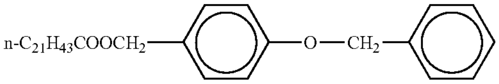
(95)
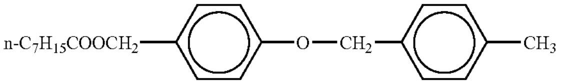
(96)
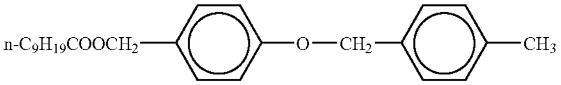
(97)
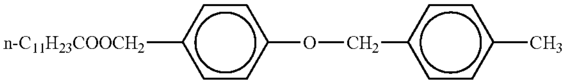
(98)
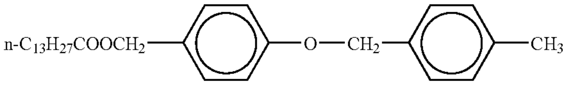
(99)
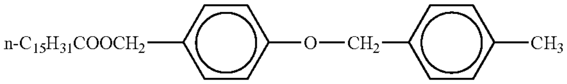
(100)
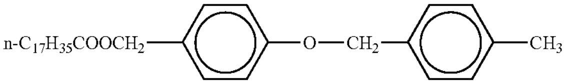
(101)
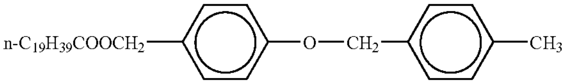
(102)
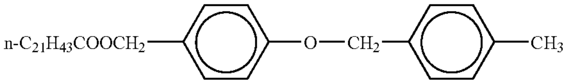
-continued
(103)
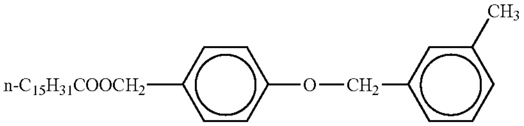
(104)
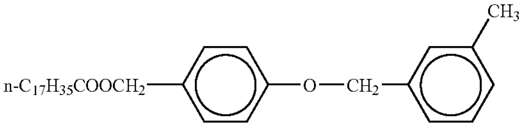
(105)
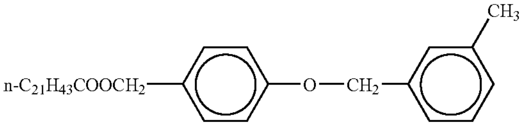
(106)
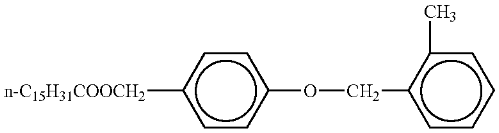
(107)
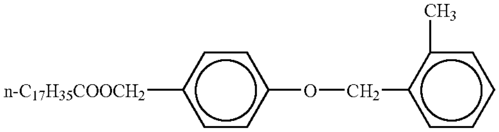
(108)
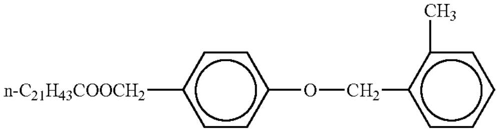
(109)
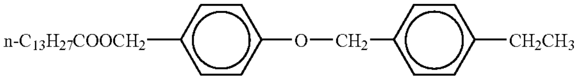
(110)
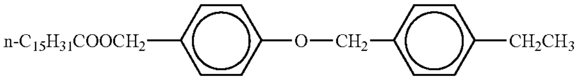
(111)
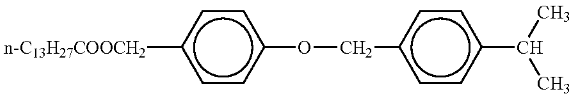
(112)
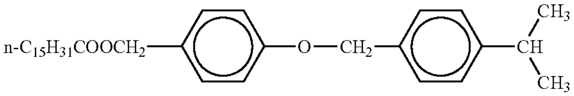
(113)
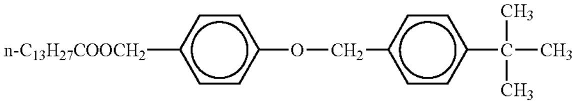

-continued
(114)
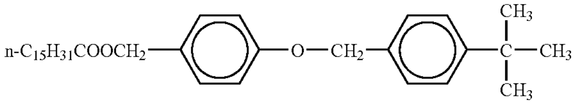
(115)
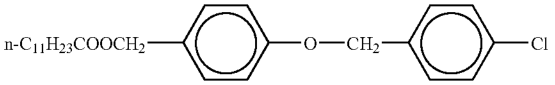
(116)
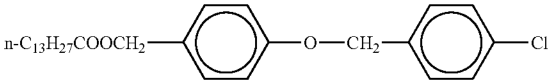
(117)
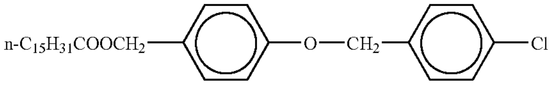
(118)
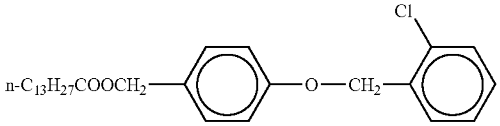
(119)
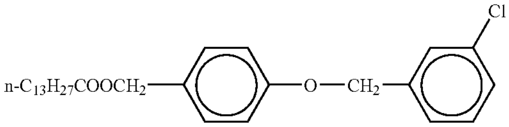
(120)
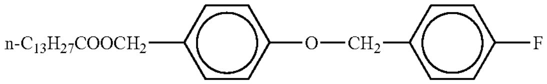
(121)
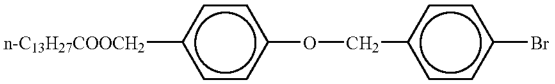
(122)
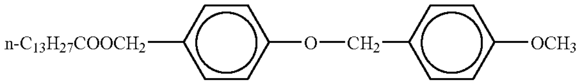
(123)
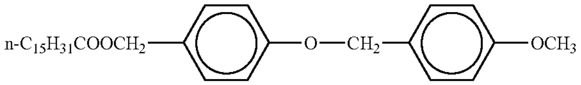
(124)
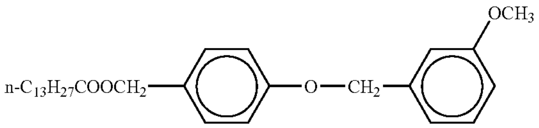
(125)
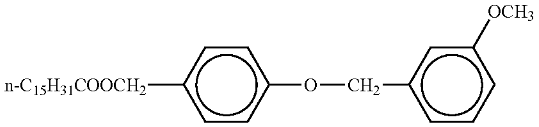
-continued
(化合物126)
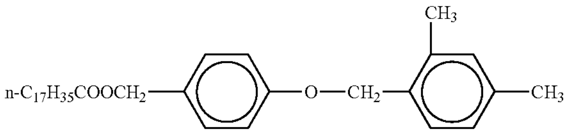
(127)
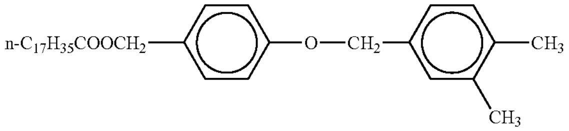
(化合物128)
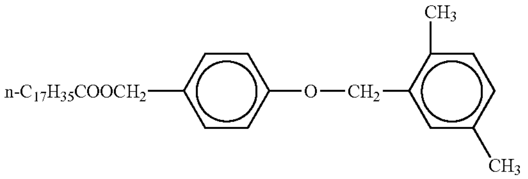
(129)
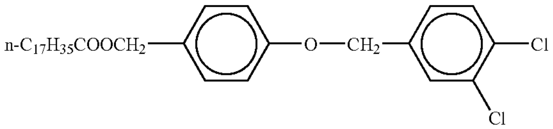
(130)
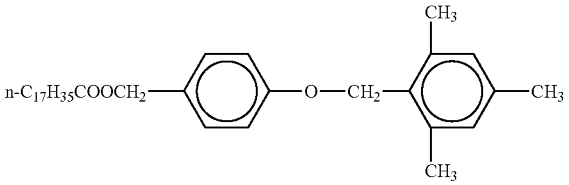
(131)
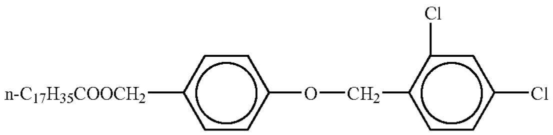
(132)
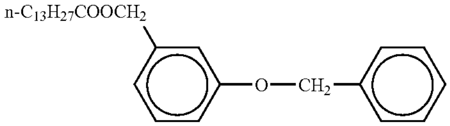
(133)
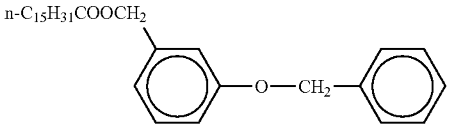
(134)
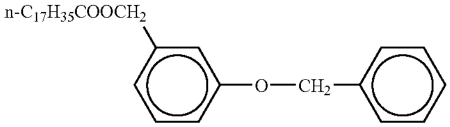
(135)
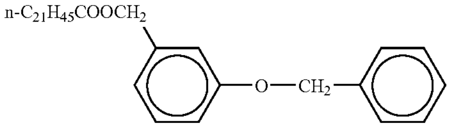

-continued
(136)
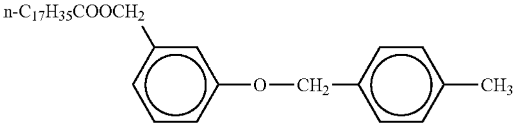
(137)
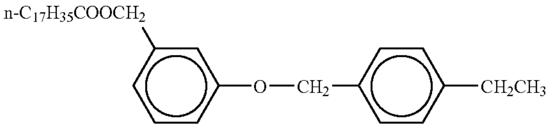
(138)
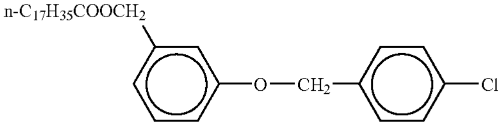
(139)
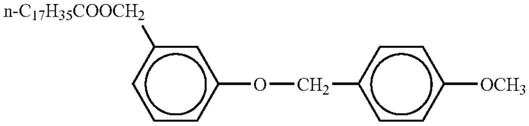
(140)
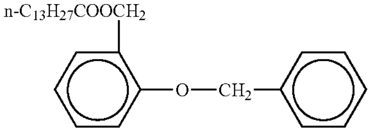
(141)
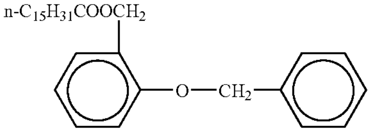
(142)
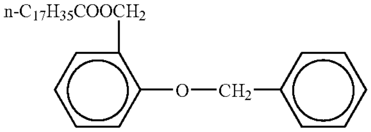
(143)
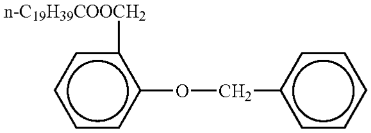
(144)
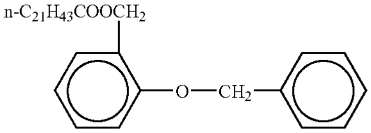
(145)
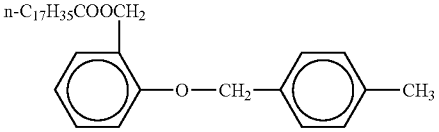
(146)
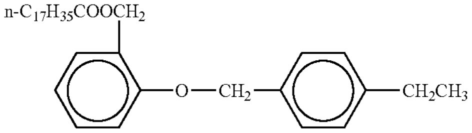
-continued
(147)
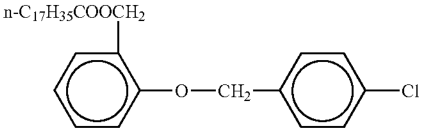
(148)
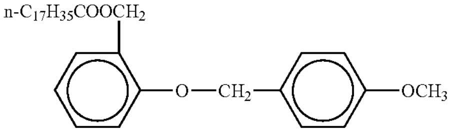
(149)
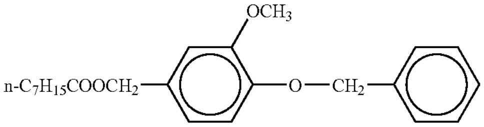
(150)
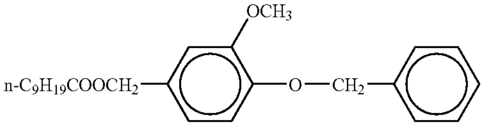
(151)
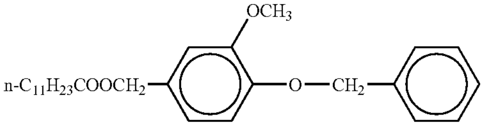
(152)
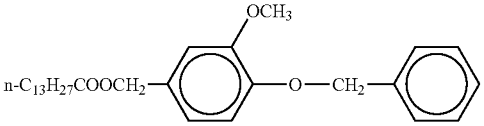
(153)
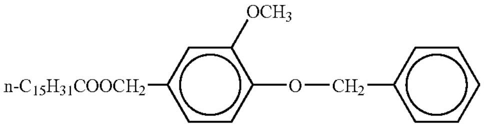
(154)
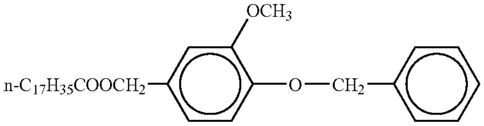
(155)
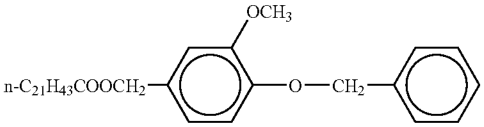
(156)
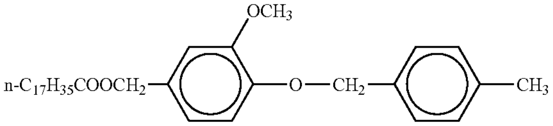
(157)
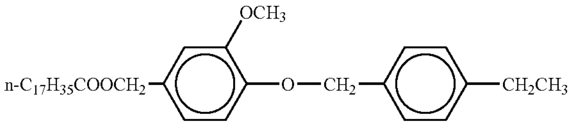

-continued
(158)
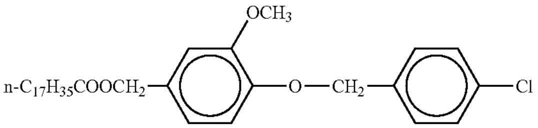
(159)
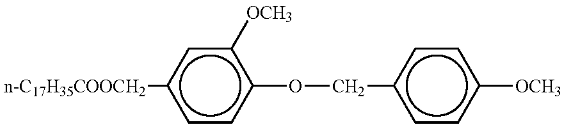
(160)
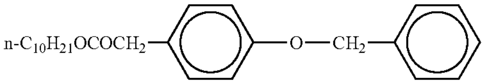
(161)
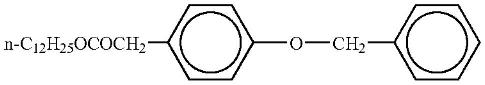
(162)
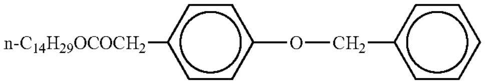
(163)
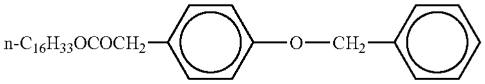
(164)
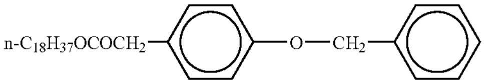
(165)
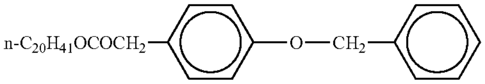
(166)
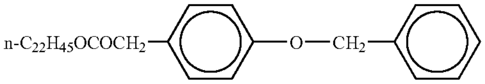
(167)
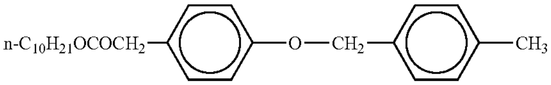
(168)
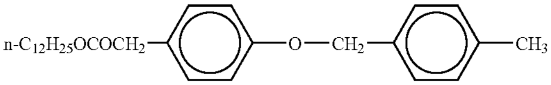
(169)
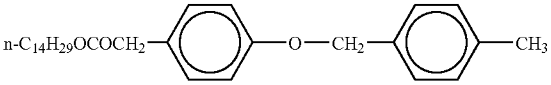
(170)
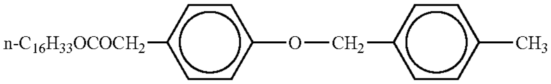
(171)
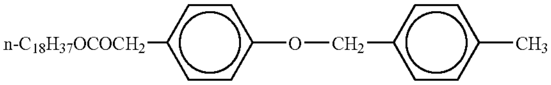
-continued
(172)
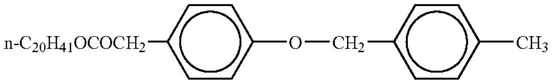
(173)
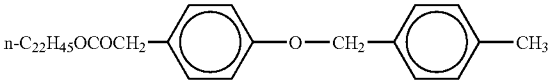
(174)
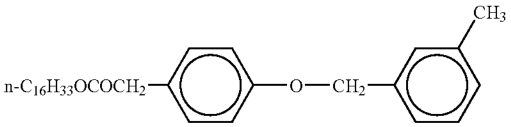
(175)
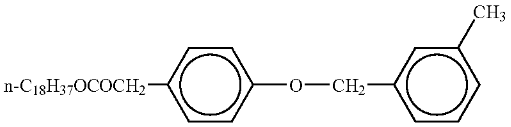
(176)
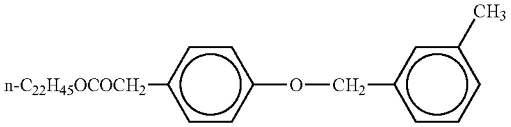
(177)
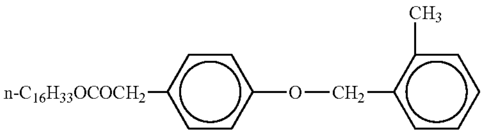
(178)
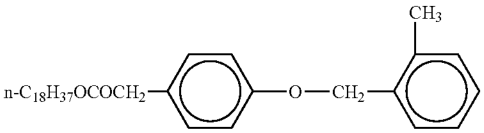
(179)
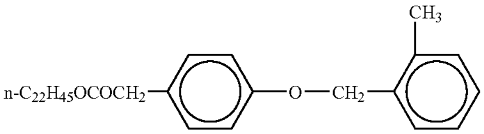
(180)
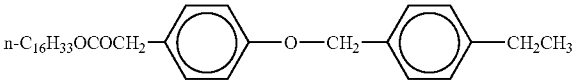
(181)
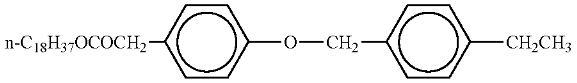
(182)
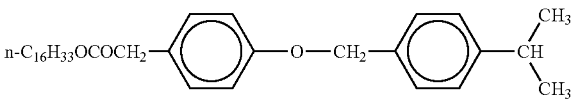
(183)
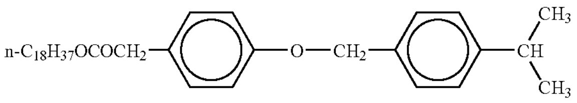

-continued
(184)
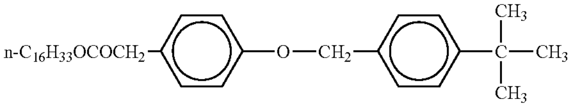
(185)
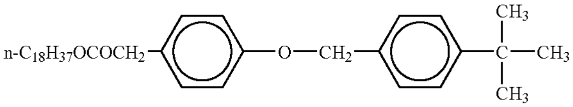
(186)
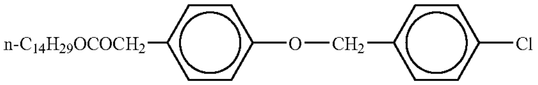
(187)
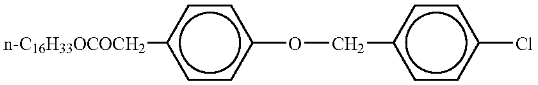
(188)
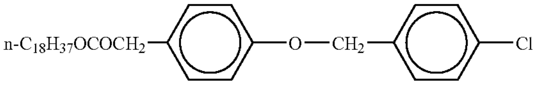
(189)
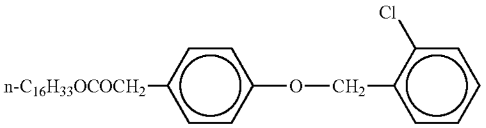
(190)
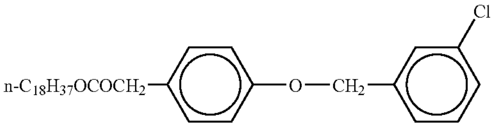
(191)
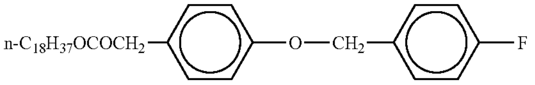
(192)
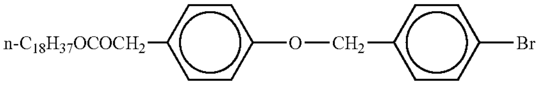
(193)
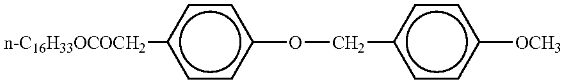
(194)
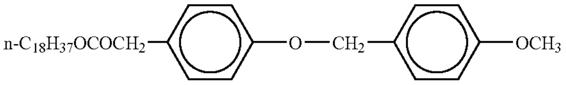
(195)
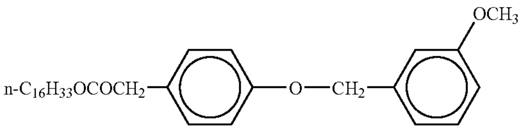
-continued
(196)
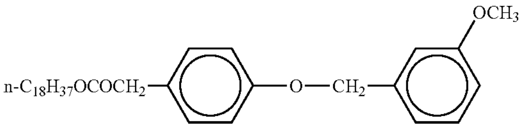
(197)
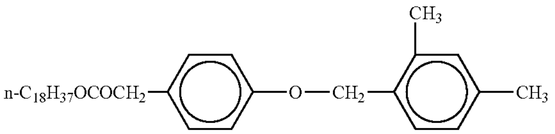
(198)
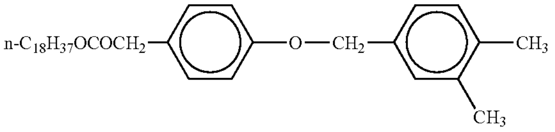
(199)
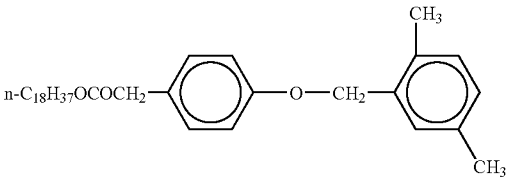
(200)
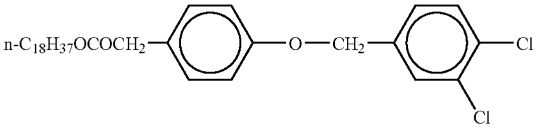
(201)
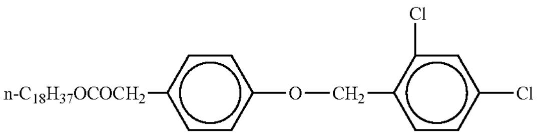
(202)
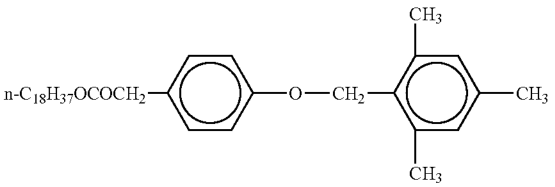
(203)
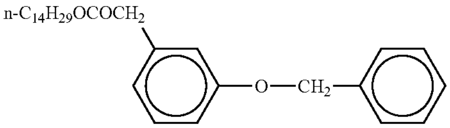
(204)
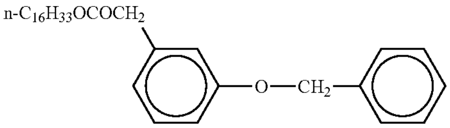

-continued
(205)
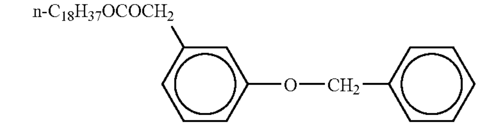
(206)
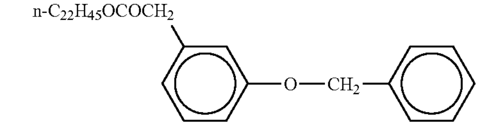
(207)
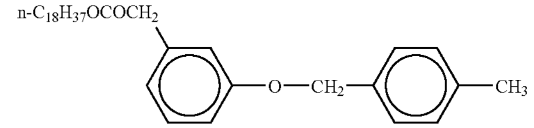
(208)
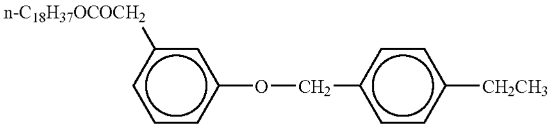
(209)
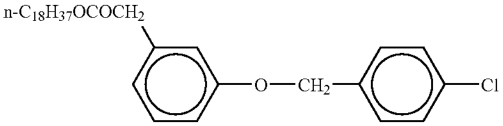
(210)
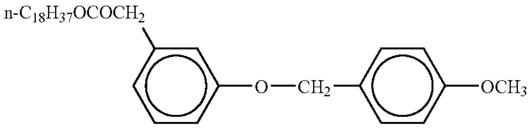
(211)
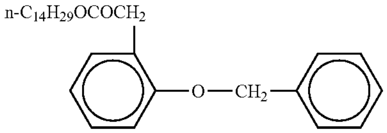
(212)
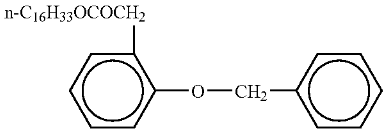
(213)
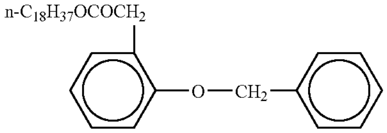
(214)
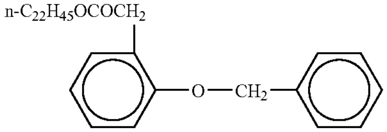
-continued
(215)
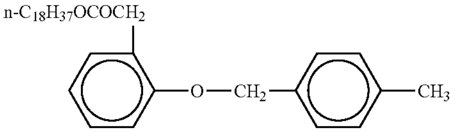
(216)
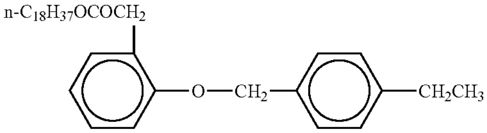
(217)
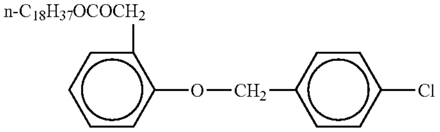
(218)
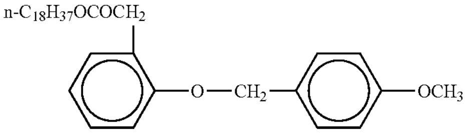
(219)
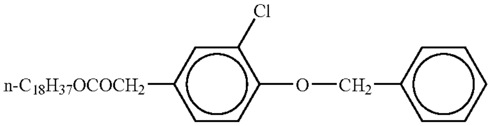
(220)
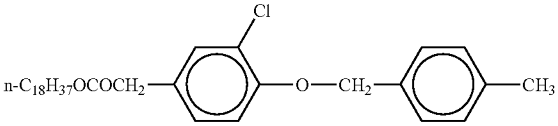
(221)
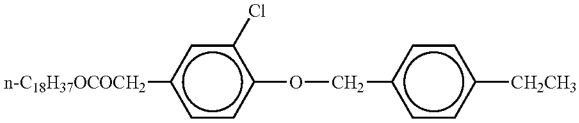
(222)
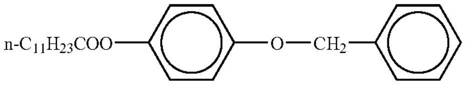
(223)
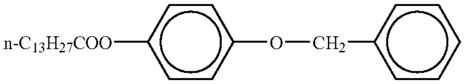
(224)
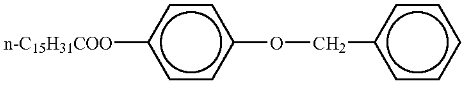
(225)
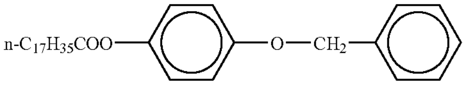
(226)
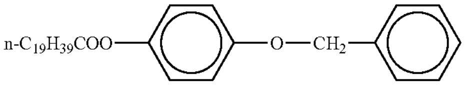

-continued
(227)
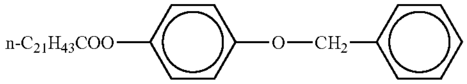
(228)
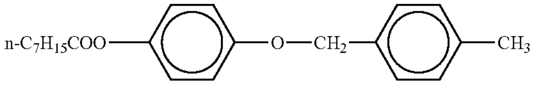
(229)
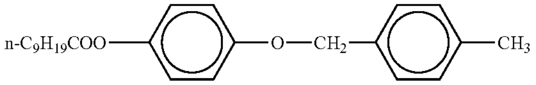
(230)
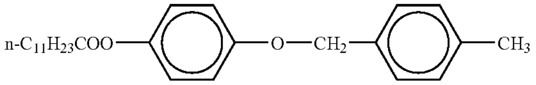
(231)
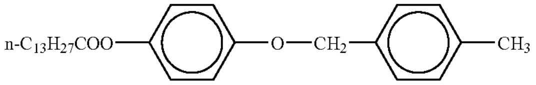
(232)
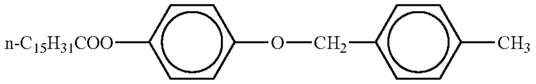
(233)
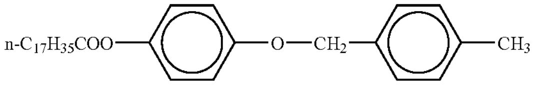
(234)
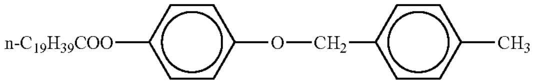
(235)
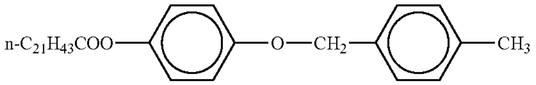
(236)
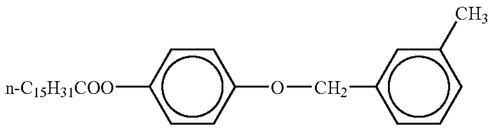
(237)
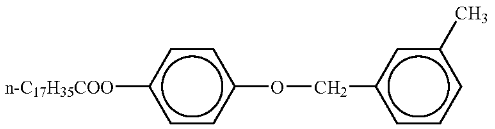
(238)
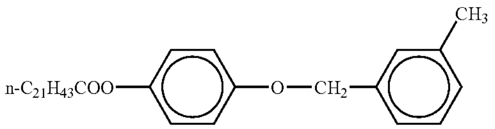
-continued
(239)
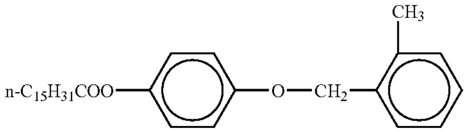
(240)
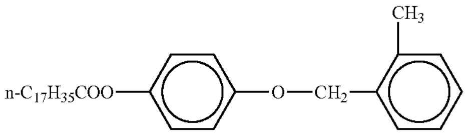
(241)
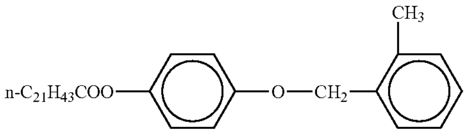
(242)
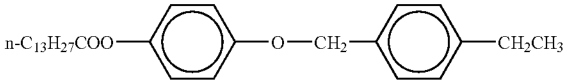
(243)
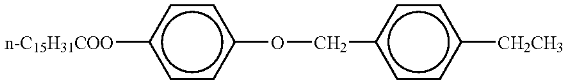
(244)
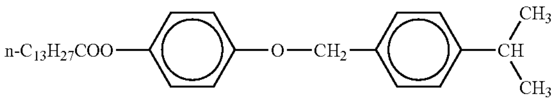
(245)
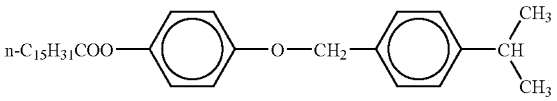
(246)
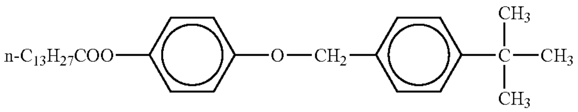
(247)
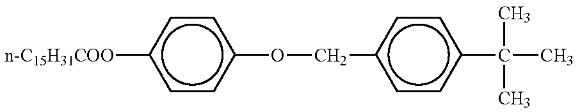
(248)
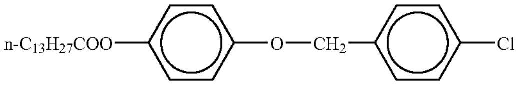
(249)
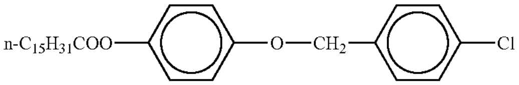
(250)
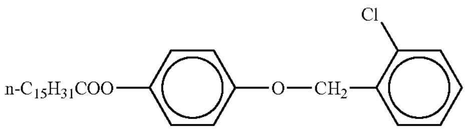

-continued
(251)
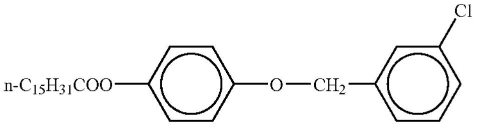
(252)
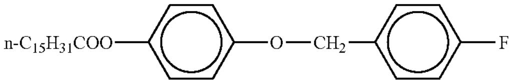
(253)
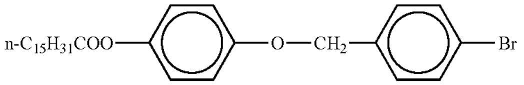
(254)
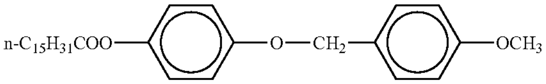
(255)
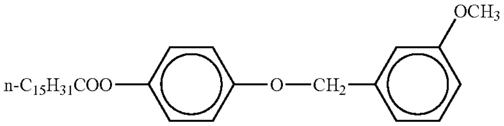
(256)
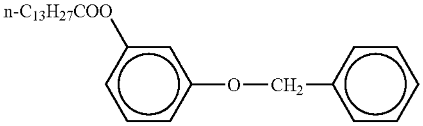
(257)
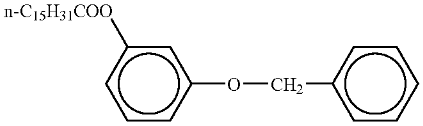
(258)
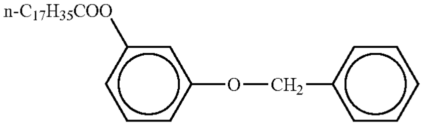
(259)
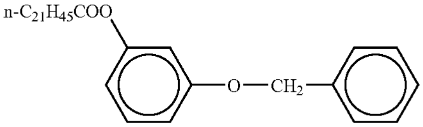
(260)
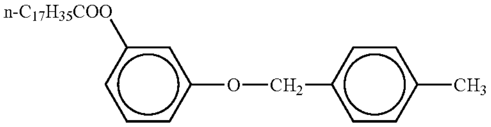
(261)
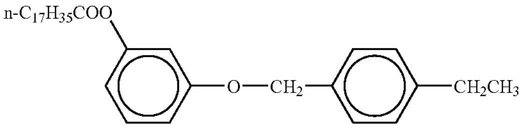
-continued
(262)
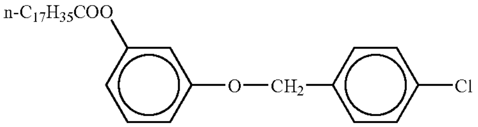
(263)
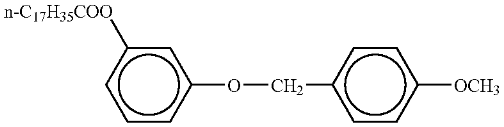
(264)
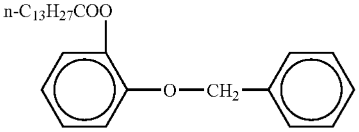
(265)
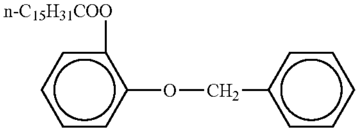
(266)
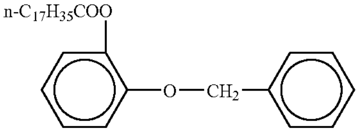
(267)
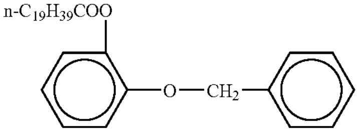
(268)
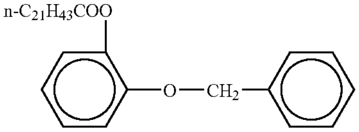
(269)
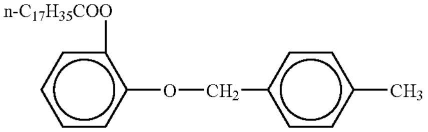
(270)
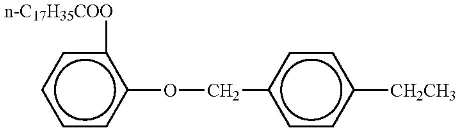
(271)
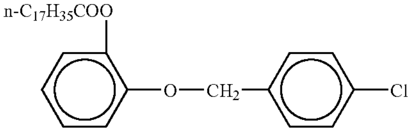
(272)
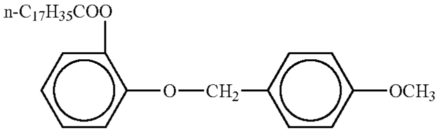

-continued
(273)
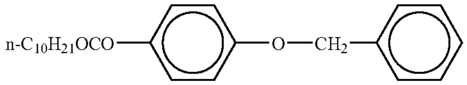
(274)
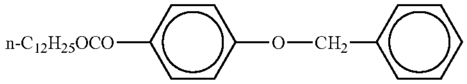
(275)
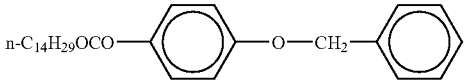
(276)
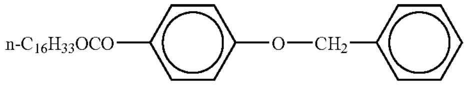
(277)
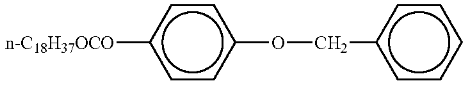
(278)
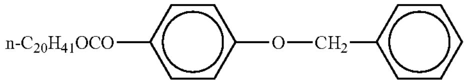
(279)
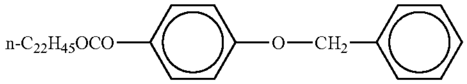
(280)
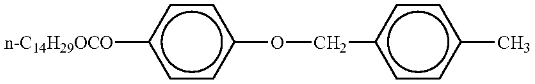
(281)
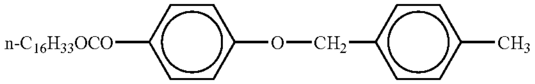
(282)
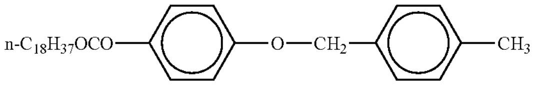
(283)
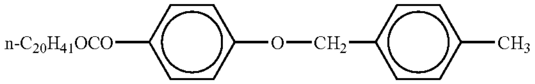
(284)
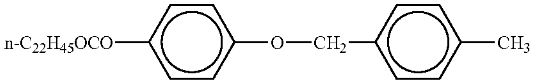
(285)
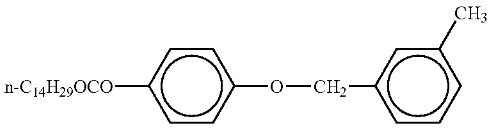
(286)
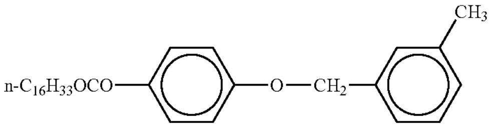
-continued
(287)
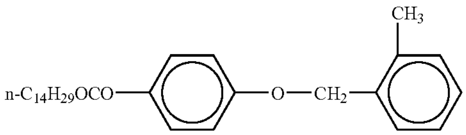
(288)
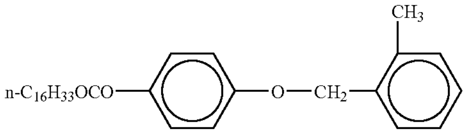
(289)
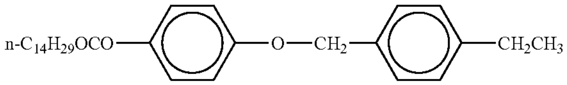
(290)
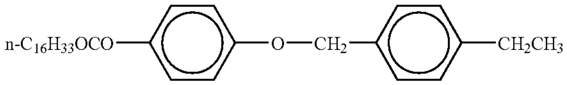
(291)
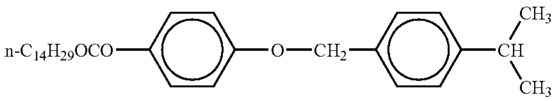
(292)
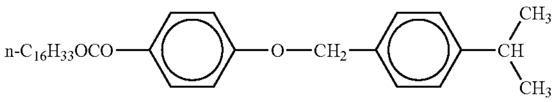
(293)
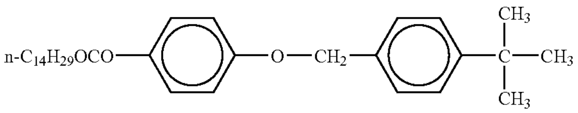
(294)
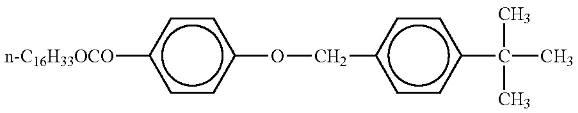
(295)
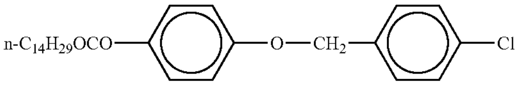
(296)
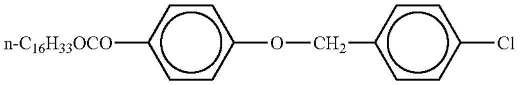
(297)
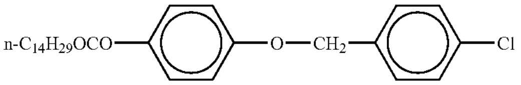
(298)
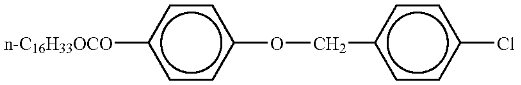

-continued
(299)
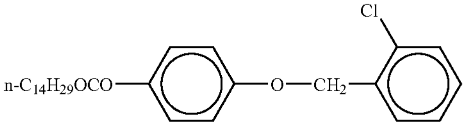
(300)
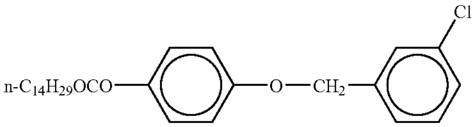
(301)
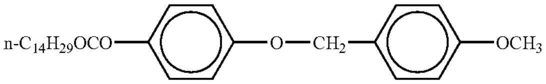
(302)
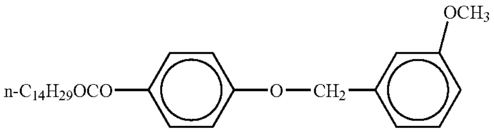
(303)
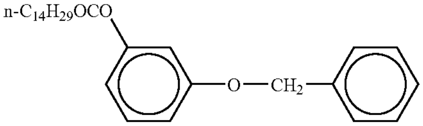
(304)
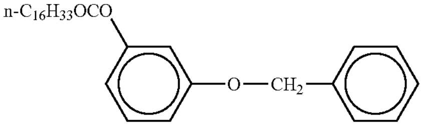
(305)
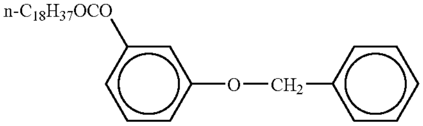
(306)
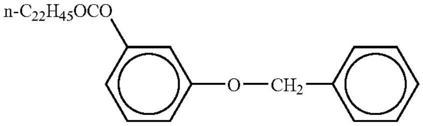
(307)
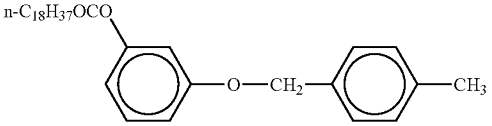
(308)
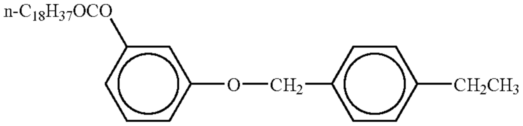
(309)
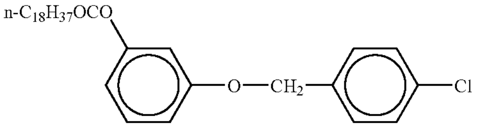
-continued
(310)
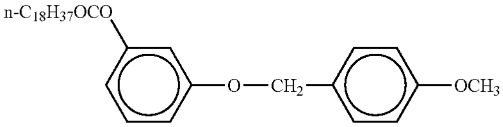
(311)
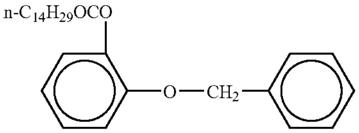
(312)
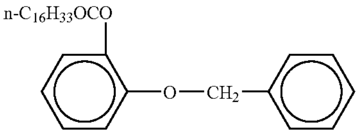
(313)
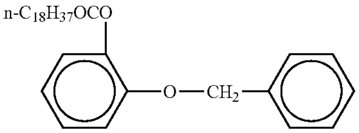
(314)
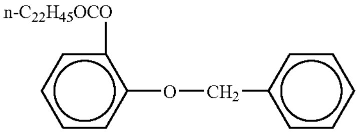
(315)
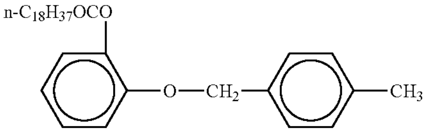
(316)
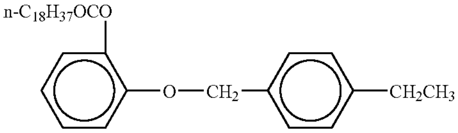
(317)
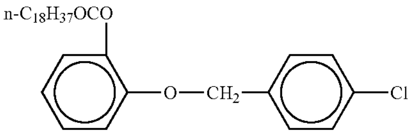
(318)
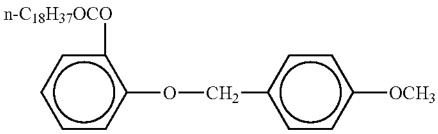
(319)
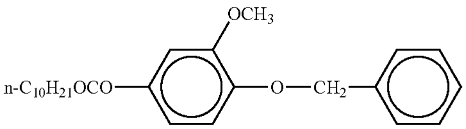

-continued
(320)
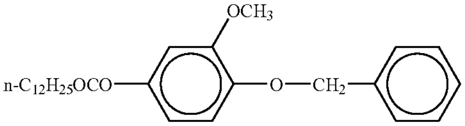
(321)
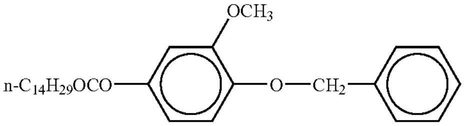
(322)
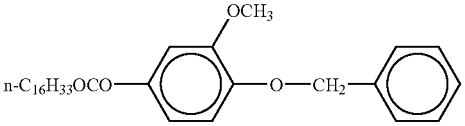
(323)
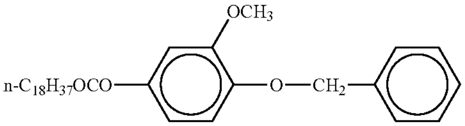
(324)
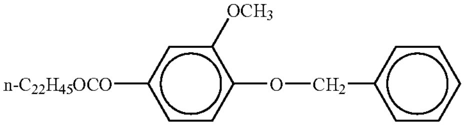
(325)
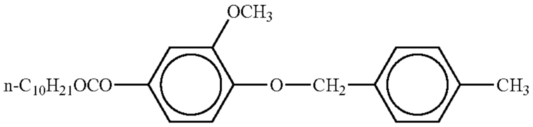
(326)
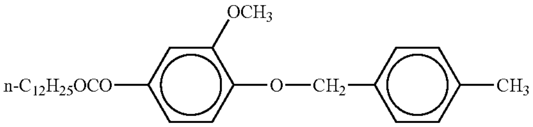
(327)
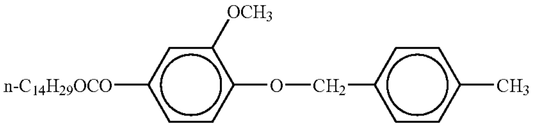
(328)
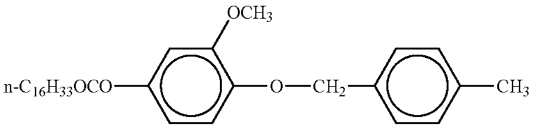
(329)
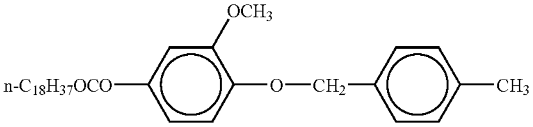
-continued
(330)
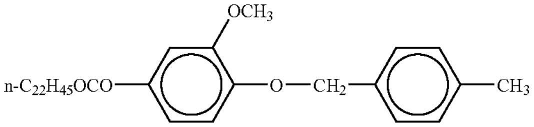
(331)
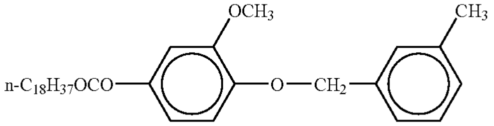
(332)
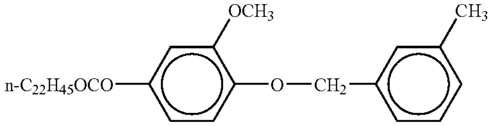
(333)
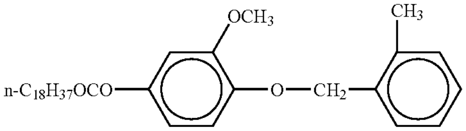
(334)
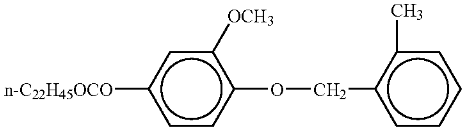
(335)
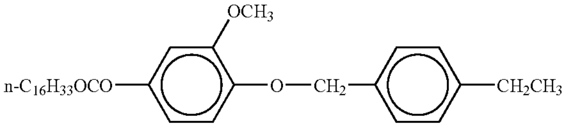
(336)
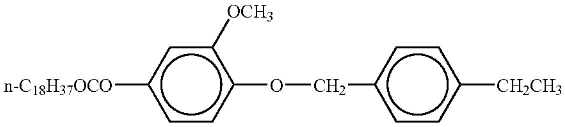
(337)
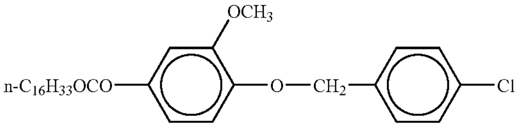
(338)
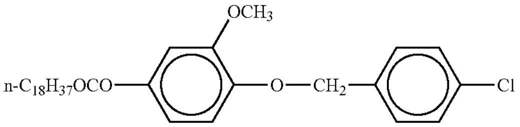
(339)
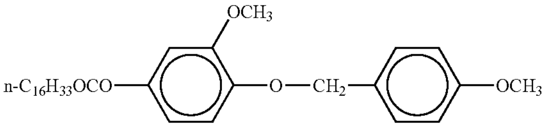

-continued
(340)
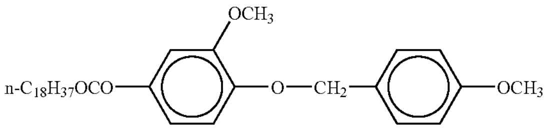
(341)
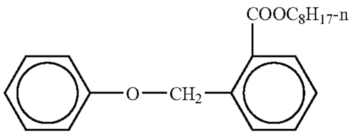
(342)
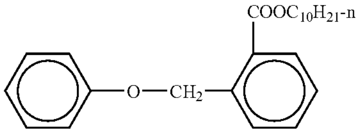
(343)
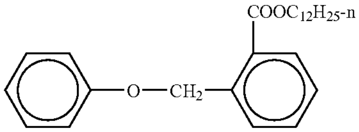
(344)
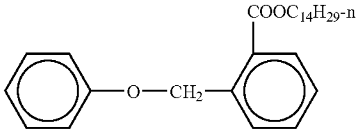
(345)
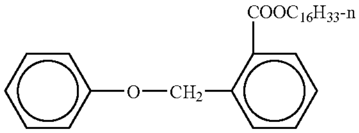
(346)
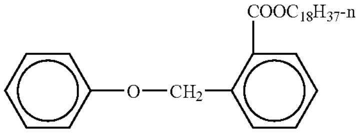
(347)
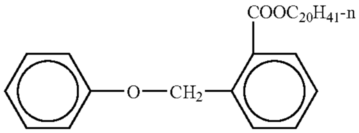
(348)
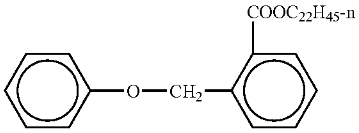
(349)
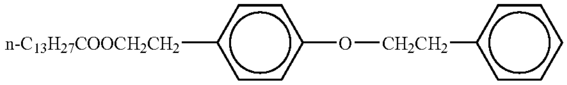
(350)
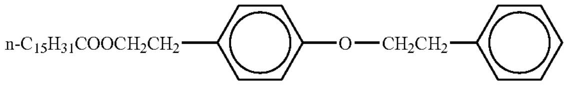
-continued
(351)
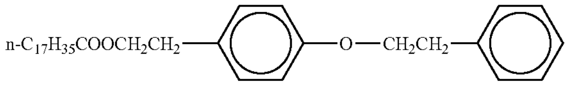
(352)
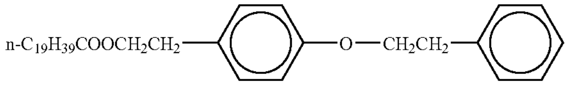
(353)
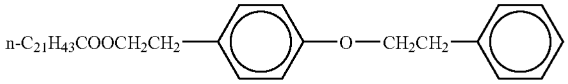
(354)
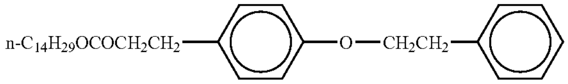
(355)
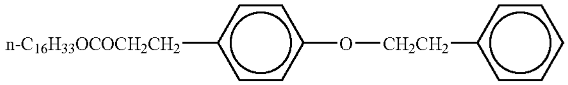
(356)
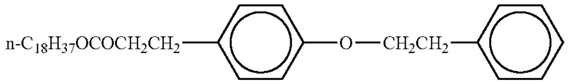
(357)
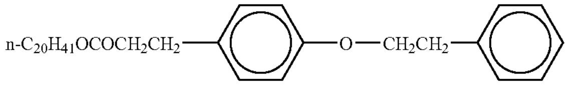
(358)
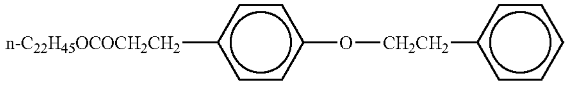
(359)
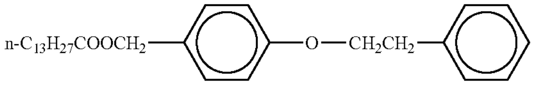
(360)
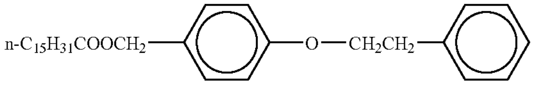
(361)
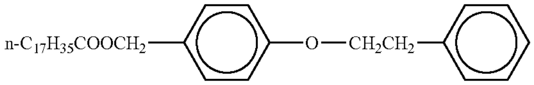
(362)
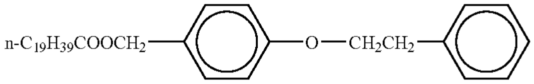
(363)
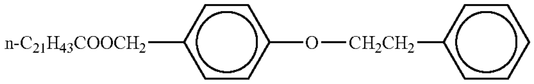
(364)
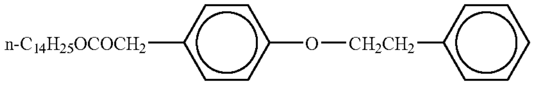

-continued
(365)
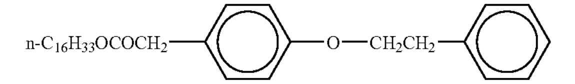
(366)
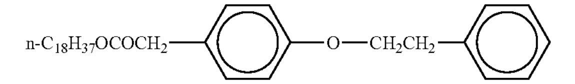
(367)
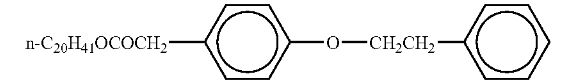
(368)
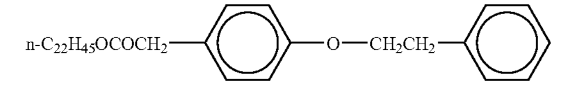
(369)
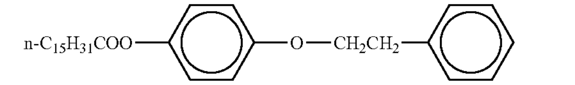
(370)
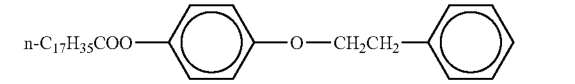
(371)
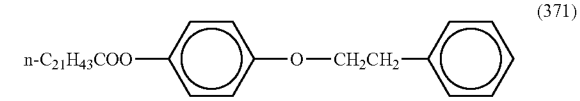
(372)
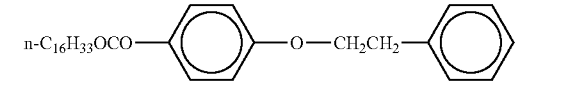
(373)
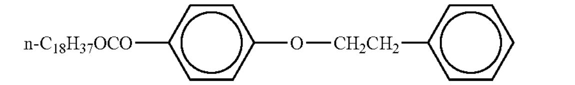
(374)
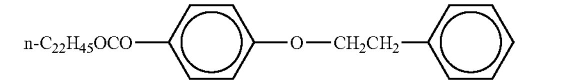
(375)
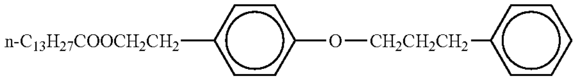
(376)
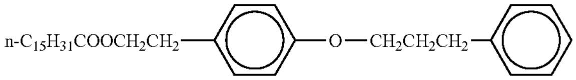
(377)
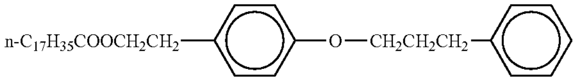
(378)
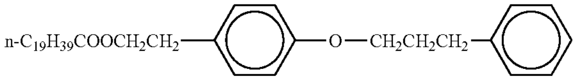
-continued
(379)
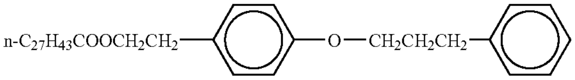
(380)
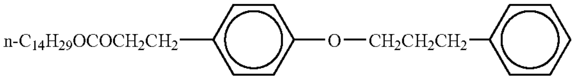
(381)
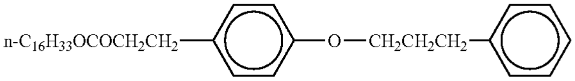
(382)
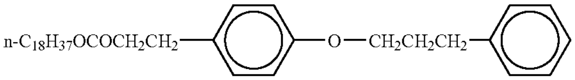
(383)
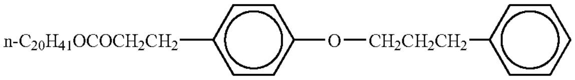
(384)
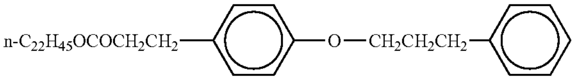
(385)
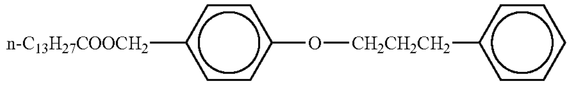
(386)
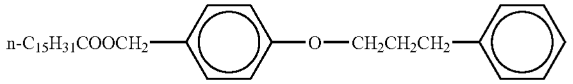
(387)
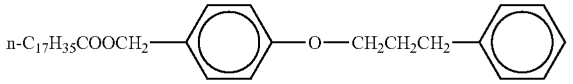
(388)
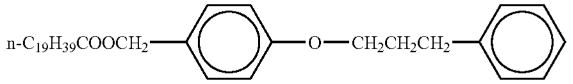
(389)
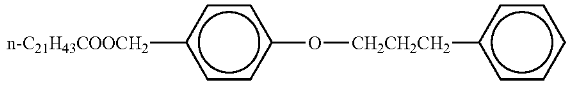
(390)
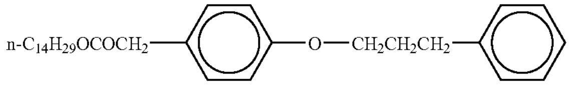
(391)
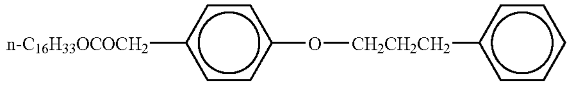
(392)
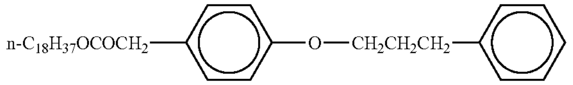

-continued
(393)
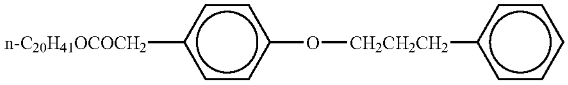
(394)
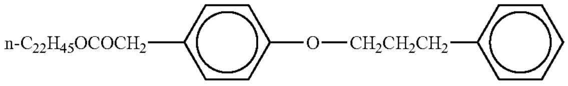
(395)
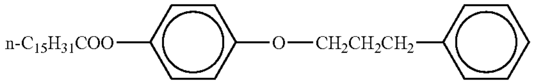
(396)
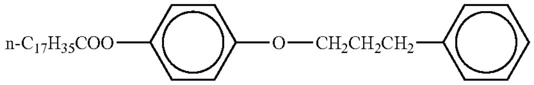
(397)
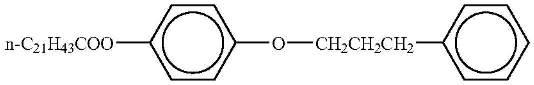
(398)
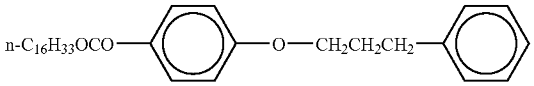
(399)
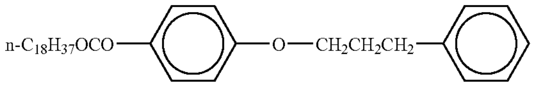
(400)
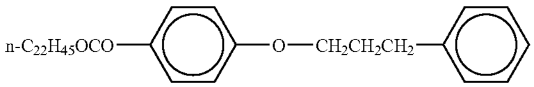
(401)
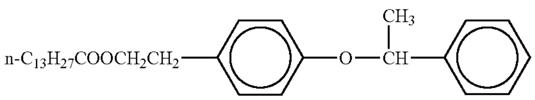
(402)
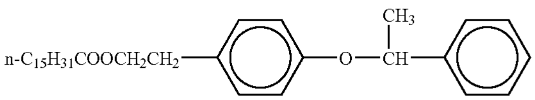
(403)
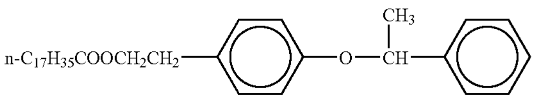
(404)
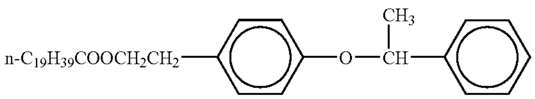
(405)
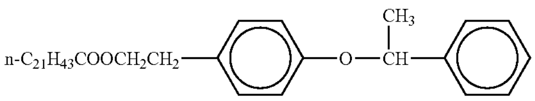
-continued
(406)
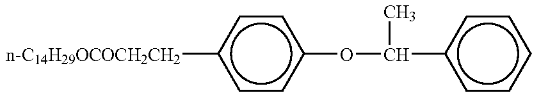
(407)
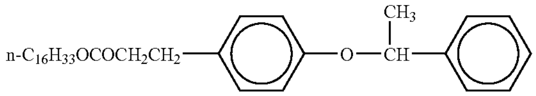
(408)
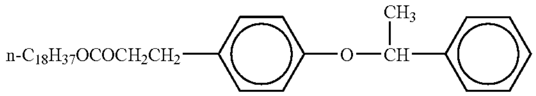
(409)
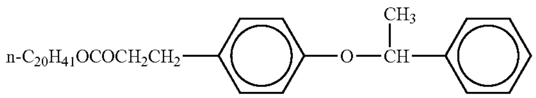
(410)
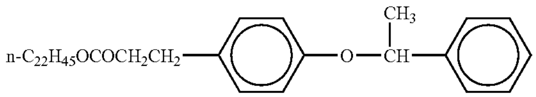
(411)
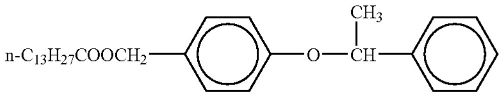
(412)
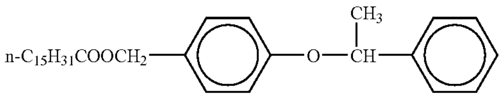
(413)
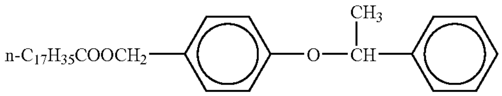
(414)
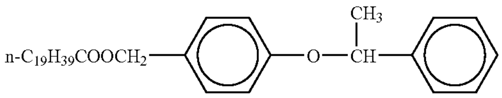
(415)
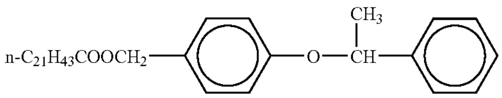
(416)
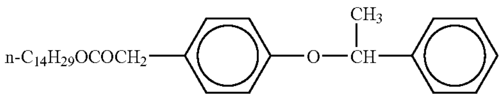
(417)
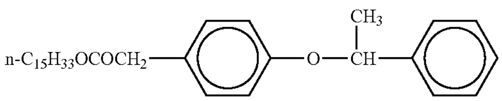

-continued (418)

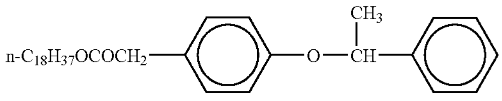

(419)

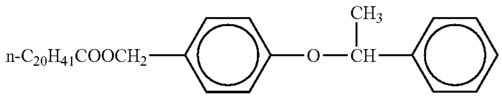

(420)

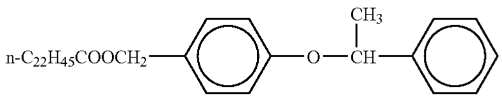

(421)

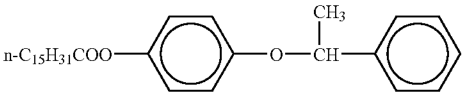

(422)

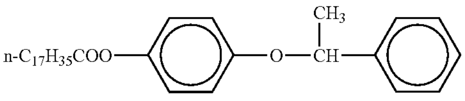

(423)

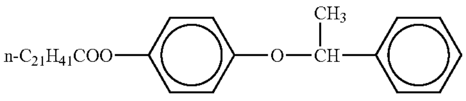

(424)

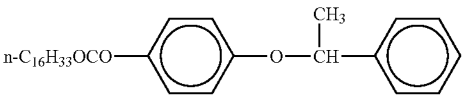

(425)

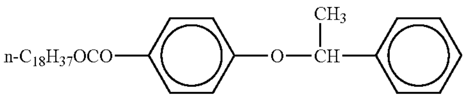

(426)

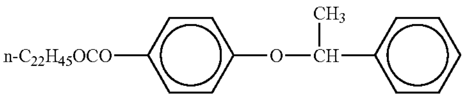

Of the compounds represented by the formula (II), those having a hydrogen atom as $R_1$ are preferred because use of it enables to obtain a thermochromic coloring color-memory composition having a broader maximum hysteresis width. Those having a hydrogen atom as $R_1$ and 0 as m are more preferred.

When the above-described compound is used, the resulting composition has a maximum hysteresis width almost equal to or greater than that of the conventional thermochromic coloring color-memory composition using an ester. Described specifically, the maximum hysteresis width (ΔH) is from 8 to 70° C.

The composition having such a maximum hysteresis width is excellent in the function of selectively retaining either one of a color on the lower temperature side and a color on the higher temperature side with a discoloration temperature as a barrier. It can therefore be used for a wide variety of applications.

Although the above-described compound is used as the component (C) of the present invention, another compound such as ester, alcohol, carboxylic acid, ketone or amide can be added as needed within a range not causing a great change in the hysteresis characteristic. In this case, it is preferred to add it in an amount of 20 or less (parts by weight), based on 100 of the compound of the invention, because a desired color memory effect can be exhibited effectively at such an amount.

A homogeneous solubilized mixture indicates the state that components (A), (B) and (C) are homogeneously mixed together.

The homogeneous solubilized mixture is obtained by, after mixing components (A), (B) and (C), dissolving components (A) and (B) in component (C).

A homogeneous solubilized mixture composed of the above-described three components (A), (B) and (C) can be encapsulated in microcapsules to form a reversible thermochromic microcapsule pigment. By protecting the mixture with a capsule membrane wall, not only its function does not deteriorate even if it is brought into contact with a chemically active substance such as acid substance, basic substance or peroxide, or another solvent component but also the mixture has improved heat stability.

Moreover, it is possible to provide the microcapsules for practical use after improving their durability by forming a secondary resin film on their surface or modifying their surface properties.

The above-described microcapsules satisfy the practicality when their average particle size is within a range of from 0.5 to 50 μm, preferably from 1 to 30 μm, more preferably from 1 to 20 μm.

When a system of the above-described microcapsules has a maximum outer diameter exceeding 50 μm on average, it lacks in dispersion stability and processing suitability in blending in inks, paints or thermoplastic resins.

On the other hand, when the system has a maximum outer diameter of 0.5 μm or less on average, high density coloring can hardly be attained.

By reducing the size of the microcapsules, ΔH can be widened further compared with the ΔH of the homogeneous solubilized mixture of the three necessary components.

The above-described microcapsules are effective when an encapsulated body:wall membrane ratio falls within a range of 7:1 to 1:1 (weight ratio). The ratio of the wall membrane exceeding the above-described range inevitably causes deterioration in the color density and vividness during color development. The encapsulated body:wall membrane ratio falling within a range of from 6:1 to 1:1 (weight ratio) is preferred.

Examples of the microencapsulation method include conventionally known isocyanate interfacial polymerization, in situ polymerization such as of melamine-formalin system, submerged coat hardening, phase separation from aqueous solution, phase separation from organic solvent, melt dispersion cooling, aerial suspension coating and spray drying. It can be selected as needed, depending on the using purpose.

An ordinarily employed dyestuff or pigment (non-thermochromic one) may be added to the microcapsule pigment to cause discoloration behavior from a color (1) to a color (2).

The above-described thermochromic coloring color-memory composition or thermochromic coloring color-memory microcapsule pigment having the composition encapsulated therein can be used, after dispersed in a vehicle containing various additives if necessary, as a thermochromic coloring color-memory liquid composition for printing ink to be used in screen printing, offset printing, process printing, gravure printing, coater or pad application, a paint to be used in brush coating, spray coating, electrostatic coating, electrodeposition coating, flow coating, roller coating or dip coating, an ink for ink jet use, an ink for use in writing or coating implements such as marking pen, ball-point pen, fountain pen and writing brush pen, and a coloring liquid for use in crayon, colors, cosmetics or fibers.

The material of a support is not limited and every material is effective, and its examples include paper, synthetic paper, fiber, cloth, synthetic leather, leather, plastics, glass, pottery materials, metals, wood and stone, which may be not only in a flat shape but also in an irregular form.

In the case where a non-thermochromic coloring layer (including an image) has been formed in advance on the above-described support, the coloring layer can be in-visualized by a temperature change, so that the changing mode can be further varied.

In addition, the above-described thermochromic coloring color-memory composition and thermochromic coloring color-memory microcapsule pigment having the composition encapsulated therein can each be melt-blended with a thermoplastic resin, thermosetting resin, wax or the like and used as a resin composition for thermochromic coloring color-memory molding in the form of pellet, powder or paste.

The above-described resin for molding can be injection molded, extruded, blow molded or cast molded in a general manner into three-dimensional moldings of any shape, or moldings such as films, sheets, plates, filaments, rods or pipes.

Examples of the above-described additive include crosslinking agents, curing agents, desiccants, plasticizers, viscosity regulators, dispersing agents, ultraviolet absorbents, antioxidants, light stabilizers, anti-settling agents, lubricants, gelling agents, antifoaming agents, flatting agents, penetrating agents, pH regulators, foaming agents, coupling agents, humectants, fungicides, antiseptics and anticorrosive agents.

An ordinarily employed dyestuff or pigment (non-thermochromic one) may be added to the above-described liquid composition or resin composition for molding to cause discoloration behavior from a color (1) to a color (2).

By stacking a layer containing a light stabilizer and/or transparent metalescent pigment over a laminated product or molded product prepared by forming, while using the liquid composition, a reversible thermochromic layer on a support, light resistance of the product can be improved. It is also possible to improve the durability of the product by laying a topcoat layer thereon.

As the transparent metalescent pigment, a pigment prepared by coating the surface of a core substance such as natural mica, synthetic mica, glass piece, alumina or a piece of a transparent film with a metal oxide such as titanium oxide can be exemplified.

Specific examples of the product prepared using the above-described thermochromic coloring color-memory composition or thermochromic coloring color-memory microcapsule pigment containing the composition include doll- or animal-figured toys, hair for a doll- or animal figured toy, doll accessories such as house, furniture, clothing, hat, bag and shoes for a doll, accessory toys, stuffed dolls, painting toys, picture books for toys, puzzle toys such as a jigsaw puzzle, toy bricks, block toys, clay toys, fluid toys, tops, kites, musical instrument toys, cooking toys, gun toys, capturing toys, background toys, toys imitating vehicles, animals, plants, buildings or food articles, clothes such as a T-shirt, a sweet shirt, a blouse, a dress, a bathing suit, a raincoat and a skiwear, footwear such as shoes and shoelaces, personal effects made of cloth such as a handkerchief, a towel and a wrapping cloth, interior ornaments such as a rug, a curtain, a curtain cord, a tablecloth, a carpet, a cushion, a picture frame and an imitation flower, bedding such as bedclothes, a pillow and a mattress, accessories such as a ring, a bracelet, a tiara, earrings, a hair stopper, an attaching nail, a ribbon and a scarf, stationary such as a writing tool, a stamp, an eraser, a celluloid board, a ruler and an adhesive tape, cosmetics such as a lipstick, an eye shadow, a manicure, a hair dye, an attaching nail and a paint for attaching nail, kitchen utensils such as a glass, a plate, chopsticks, a spoon, a fork, a pot and a frying pan, various printed matters such as a calendar, a label, a card, a recording material and those for forgery prevention, books such as a picture book, gloves, a necktie, a hat, a bag, a container for packing use, embroidery thread, sporting goods, fishing goods, a toothbrush, a coaster, a watch, eyeglasses, lighting fixture, an air conditioner, a musical instrument, a pocket body warmer, a cold reserving agent, a photo stand, bags and pouches of all kinds such as a purse, an umbrella, furniture, a vehicle, a construction, a temperature detecting indicator and training goods.

EXAMPLES

Examples of the invention will next be described. It should however be borne in mind that the invention is not limited to or by these examples.

The preparation process of a thermochromic coloring color-memory composition or a microcapsule pigment containing the same and the measuring method of hysteresis characteristics, depending on a temperature change, of the thermochromic coloring color-memory composition or microcapsule pigment containing the same, in respective examples, will hereinafter be described.

The term "part(s)" in the following examples means part(s) by weight.

Example 1

A thermochromic coloring color-memory composition was obtained by homogeneously compatibilizing 2.0 parts of 3-(4-diethylamino-2-hexyloxyphenyl)-3-(1-ethyl-2-methylindol-3-yl)-4-azaphthalide as the component (A), 4.0 parts of 2,2-bis(4'-hydroxyphenyl)hexafluoropropane and 4.0 parts of 1,1-bis(4'-hydroxyphenyl)-2-methylpropane as the component (B) and 50.0 parts of 1,1-diphenylmethyl palmitate as the component (C).

The resulting thermochromic coloring color-memory composition changed color from blue to colorless.

Example 2

A thermochromic coloring color-memory microcapsule pigment suspension was obtained by uniformly heat-dissolving a thermochromic coloring color-memory composition composed of 2.0 parts of 3-(4-diethylamino-2-hexyloxyphenyl)-3-(1-ethyl-2-methylindol-3-yl)-4-azaphthalide as the component (A), 4.0 parts of 2,2-bis(4'-hydroxyphenyl) hexafluoropropane and 4.0 parts of 1,1-bis(4'-hydroxyphenyl)-2-methylpropane as the component (B) and 50.0 parts of 1,1-diphenylmethyl palmitate as the component (C), adding, to the resulting solution, a solution obtained as a wall membrane material by mixing 30.0 parts of an aromatic polyvalent isocyanate prepolymer and 50.0 parts of a co-solvent, emulsifying and dispersing the resulting mixture to form microdroplets in a 8% aqueous polyvinyl alcohol solution, continuing stirring at 70° C. for about 1 hour, adding 2.5 parts of a water-soluble aliphatic modified amine to the reaction mixture, and continuing stirring for further 6 hours.

By isolating the pigment from the above-described microcapsule pigment suspension by centrifugal separation, a thermochromic coloring color-memory microcapsule pigment having an average particle size of 3 μm and changing color from blue to colorless was obtained.

Example 3

A thermochromic coloring color-memory microcapsule pigment suspension was obtained by uniformly heat-dissolving a thermochromic coloring color-memory composition composed of 2.0 parts of 3-(4-diethylamino-2-hexyloxyphenyl)-3-(1-ethyl-2-methylindol-3-yl)-4-azaphthalide as the component (A), 4.0 parts of 2,2-bis(4'-hydroxyphenyl) hexafluoropropane and 4.0 parts of 1,1-bis(4'-hydroxyphenyl)-2-methylpropane as the component (B) and 50.0 parts of 1,1-diphenylmethyl stearate as the component (C), adding, to the resulting solution, a solution obtained as a wall membrane material by mixing 30.0 parts of an aromatic polyvalent isocyanate prepolymer and 50.0 parts of a co-solvent, emulsifying and dispersing the resulting mixture to form micro-droplets in a 8% aqueous polyvinyl alcohol solution, continuing stirring at 70° C. for about 1.5 hours, adding 2.5 parts of a water-soluble aliphatic modified amine to the reaction mixture and continuing stirring for further 6 hours.

By isolating the pigment from the above-described microcapsule pigment suspension by centrifugal separation, a thermochromic coloring color-memory microcapsule pigment having an average particle size of 3 μm and changing color from blue to colorless was obtained.

Example 4

A thermochromic coloring color-memory microcapsule pigment suspension was obtained by uniformly heat-dissolving a thermochromic coloring color-memory composition composed of 2.0 parts of 3-(4-diethylamino-2-hexyloxyphenyl)-3-(1-ethyl-2-methylindol-3-yl)-4-azaphthalide as the component (A), 4.0 parts of 2,2-bis(4'-hydroxyphenyl) hexafluoropropane and 4.0 parts of 1,1-bis(4'-hydroxyphenyl)-2-methylpropane as the component (B) and 50.0 parts of 1,1-diphenylmethyl myristate as the component (C), adding, to the resulting solution, a solution obtained as a wall membrane material by mixing 30.0 parts of an aromatic polyvalent isocyanate prepolymer and 50.0 parts of a co-solvent, emulsifying and dispersing the resulting mixture to form microdroplets in a 8% aqueous polyvinyl alcohol solution, continuing stirring at 70° C. for about 1.5 hours, adding 2.5 parts of a water-soluble aliphatic modified amine to the reaction mixture and continuing stirring for further 6 hours.

By isolating the pigment from the above-described microcapsule pigment suspension by centrifugal separation, a thermochromic coloring color-memory microcapsule pigment having an average particle size of 3 μm and changing color from blue to colorless was obtained.

Example 5

A thermochromic coloring color-memory microcapsule pigment suspension was obtained by uniformly heat-dissolving a thermochromic coloring color-memory composition composed of 2.0 parts of 3-(4-diethylamino-2-hexyloxyphenyl)-3-(1-ethyl-2-methylindol-3-yl)-4-azaphthalide as the component (A), 4.0 parts of 2,2-bis(4'-hydroxyphenyl) hexafluoropropane and 4.0 parts of 1,1-bis(4'-hydroxyphenyl)-2-methylpropane as the component (B) and 50.0 parts of 1,1-diphenylmethyl laurate as the component (C), adding, to the resulting solution, a solution obtained as a wall membrane material by mixing 30.0 parts of an aromatic polyvalent isocyanate prepolymer and 50.0 parts of a co-solvent, emulsifying and dispersing the resulting mixture to form micro-droplets in a 8% aqueous polyvinyl alcohol solution, continuing stirring at 70° C. for about 1.5 hours, adding 2.5 parts of a water-soluble aliphatic modified amine to the reaction mixture and continuing stirring for further 6 hours.

By isolating the pigment from the above-described microcapsule pigment suspension by centrifugal separation, a thermochromic coloring color-memory microcapsule pigment having an average particle size of 3 μm and changing color from blue to colorless was obtained.

Example 6

A thermochromic coloring color-memory microcapsule pigment suspension was obtained by uniformly heat-dissolving a thermochromic coloring color-memory composition composed of 2.0 parts of 3-(4-diethylamino-2-hexyloxyphenyl)-3-(1-ethyl-2-methylindol-3-yl)-4-azaphthalide as the component (A), 4.0 parts of 2,2-bis(4'-hydroxyphenyl) hexafluoropropane and 4.0 parts of 1,1-bis(4'-hydroxyphenyl)-2-methylpropane as the component (B) and 50.0 parts of 1,1-diphenylmethyl decanoate as the component (C), adding, to the resulting solution, a solution obtained as a wall membrane material by mixing 30.0 parts of an aromatic polyvalent isocyanate prepolymer and 50.0 parts of a co-solvent, emulsifying and dispersing the resulting mixture to form microdroplets in a 8% aqueous polyvinyl alcohol solution, continuing stirring at 70° C. for about 1.5 hours, adding 2.5 parts of a water-soluble aliphatic modified amine to the reaction mixture and continuing stirring for further 6 hours.

By isolating the pigment from the above-described microcapsule pigment suspension by centrifugal separation, a thermochromic coloring color-memory microcapsule pigment having an average particle size of 3 μm and changing color from blue to colorless was obtained.

Example 7

A thermochromic coloring color-memory microcapsule pigment suspension was obtained by uniformly heat-dissolving a thermochromic coloring color-memory composition composed of 4.0 parts of 2-(2-chloroanilino)-6-di-n-butylaminofluoran as the component (A), 5.0 parts of 2,2-bis(4'-hydroxyphenyl)hexafluoropropane and 4.0 parts of 2,2-bis (4'-hydroxyphenyl)-2-methylpropane as the component (B) and 50.0 parts of 1,1-diphenylmethyl palmitate as the component (C), adding, to the resulting solution, a solution obtained as a wall membrane material by mixing 30.0 parts of an aromatic polyvalent isocyanate prepolymer and 50.0 parts of a co-solvent, emulsifying and dispersing the resulting mixture to form micro-droplets in a 8% aqueous polyvinyl alcohol solution, continuing stirring at 70° C. for about 1 hour, adding 2.5 parts of a water-soluble aliphatic modified amine to the reaction mixture and continuing stirring for further 6 hours.

By isolating the pigment from the above-described microcapsule pigment suspension by centrifugal separation, a thermochromic coloring color-memory microcapsule pigment having an average particle size of 2 μm and changing color from black to colorless was obtained.

Example 8

A thermochromic coloring color-memory microcapsule pigment suspension was obtained by uniformly heat-dissolving a thermochromic coloring color-memory composition composed of 2.0 parts of 2-(butylamino)-8-(dipentylamino)-4-methylspiro[5H-(1)benzopyrano[2,3-g]pyrimidin-5,1'(3'H)-isobenzofuran]-3-one as the component (A), 4.0 parts of 2,2-bis(4'-hydroxyphenyl)hexafluoropropane and 4.0 parts of 1,1-bis(4-hydroxyphenyl)-2-methylpropane as the component (B) and 50.0 parts of 1,1-diphenylmethyl palmitate as the component (C), adding, to the resulting solution, a solution obtained as a wall membrane material by mixing 30.0 parts of an aromatic polyvalent isocyanate prepolymer and 50.0 parts of a co-solvent, emulsifying and dispersing the resulting mixture to form micro-droplets in a 8% aqueous polyvinyl alcohol solution, continuing stirring at 70° C. for about 1 hour, adding 2.5 parts of a water-soluble aliphatic modified amine to the reaction mixture and continuing stirring for further 6 hours.

By isolating the pigment from the above-described microcapsule pigment suspension by centrifugal separation, a thermochromic coloring color-memory microcapsule pigment having an average particle size of 2 μm and changing color from pink to colorless was obtained.

Preparation of Measuring Sample

After 30 parts of the thermochromic coloring color-memory composition of Example 1 were dissolved in methyl ethyl ketone, a filter paper (No. 2 filter paper, manufactured by Toyo Roshi Kaisha) was impregnated with the resulting solution to give a measuring sample.

Using a reversible thermochromic ink prepared by dispersing 40 parts of each of the microcapsule pigments of Examples 2 to 8 in an ethylene-vinyl acetate emulsion, a circle of a predetermined size (reversible thermochromic layer) was printed on a sheet of wood-free paper by screen printing, thereby obtaining respective test samples.

Each of the test samples thus obtained was heated and cooled by the below-described method, and the discoloration behavior was plotted on a graph.

Measurement of Discoloration Temperature

The measuring sample thus prepared was set on a predetermined position of a color difference meter ("TC-3600 Color difference meter", manufactured by Tokyo Denshoku Co., Ltd.), and the color density at each temperature was measured by heating and cooling at a rate of 10° C./min with a temperature width of 100° C.

For example, in the case of Example 1, the sample was heated up to 80° C. at a rate of 10° C./min from a measurement starting temperature of 0° C., and then cooled to 0° C. at a rate of 10° C./min. The brightness at each temperature displayed on the color difference meter was plotted on a graph to prepare the color density-temperature curve as illustrated in FIG. 1, and each of $T_1$, $T_2$, $T_3$, $T_4$, $T_H$, $T_G$ and ΔH (line segment HG) was obtained.

The following table shows $T_1$ (complete coloring temperature), $T_2$ (coloring starting temperature), $T_3$ (decoloring starting temperature), $T_4$ (complete decoloring temperature), $T_H$ (temperature at a midpoint between $T_1$ and $T_2$; $T_1+T_2/2$), $T_G$ (temperature at a midpoint between $T_3$ and $T_4$; $T_3+T_4/2$) and ΔH (maximum hysteresis width; $T_G$-$T_H$) of the thermochromic coloring color-memory composition or thermochromic coloring color-memory microcapsule pigment used in each test sample.

TABLE 1

| | Thermochromic characteristic | | | | | | |
|---|---|---|---|---|---|---|---|
| Ex. | $T_1$ | $T_2$ | $T_3$ | $T_4$ | $T_H$ | $T_G$ | ΔH |
| 1 | 10 | 20 | 35 | 45 | 15 | 40 | 25 |
| 2 | −10 | −4 | 48 | 55 | −7 | 51.5 | 58.5 |
| 3 | 0 | 12 | 60 | 68 | 6 | 64 | 58 |
| 4 | −25 | −18 | 38 | 48 | −21.5 | 43 | 64.5 |
| 5 | −35 | −20 | 28 | 36 | −27.5 | 32 | 59.5 |
| 6 | −45 | −30 | 20 | 30 | −37.5 | 25 | 62.5 |
| 7 | −15 | −5 | 46 | 55 | −10 | 50.5 | 60.5 |
| 8 | −12 | −4 | 50 | 58 | −8 | 54 | 62 |

Example 9

Preparation process of a thermochromic coloring color-memory composition

A thermochromic coloring color-memory composition was obtained by uniformly compatibilizing 1.0 part of 3-(2-ethoxy-4-diethylaminophenyl)-3-(1-ethyl-2-methylindol-3-yl) as the component (A) (Component (A)-A), 3.0 parts of 1,1-bis(4-hydroxyphenyl)-2-methylpropane (Component (B)-a) and 50.0 parts of 4-(4-methylbenzyl)oxyphenylethyl decanoate as the component (C) (Compound (4) of the component (C)).

The resulting thermochromic coloring color-memory composition changed color from blue to colorless.

Preparation of Measuring Sample

A measuring sample was prepared by impregnating a filter paper (No. 2 filter paper, manufactured by Toyo Roshi Kaisha) with a methyl ethyl ketone solution (20% by weight) of the above-described thermochromic coloring color-memory composition and then completely evaporating the methyl ethyl ketone.

Measuring Method of Hysteresis Characteristic

The measuring sample thus prepared was set on a measuring portion of a color difference meter ("TC-3600 Color Difference Meter", manufactured by Tokyo Denshoku), and the color density at each temperature was measured by heating and cooling the sample at a rate of 10° C./min within a temperature range of from complete coloring temperature to complete decoloring temperature.

The brightness displayed on the color difference meter at each temperature was plotted on a graph and a color density-temperature curve as shown in FIG. 1 was prepared to find $T_1$ (complete coloring temperature), $T_2$ (coloring starting temperature), $T_3$ (decoloring starting temperature), $T_4$ (complete decoloring temperature), $T_H$ (temperature of midpoint between $T_1$ and $T_2$; $T_1+T_2/2$), $T_G$ (temperature of midpoint between $T_3$ and $T_4$; $T_3+T_4/2$) and ΔH (maximum hysteresis width; $T_G$-$T_H$) of each test sample.

Examples 10 to 15

In a similar manner to Example 9 except that the compounds as listed in the below-described table were used instead as the component (C) of the thermochromic coloring color-memory composition, thermochromic coloring color-memory compositions of Examples 10 to 15 were prepared and their hysteresis characteristic was measured.

The component (C), $T_1$, $T_2$, $T_3$, $T_4$, $T_H$, $T_G$ and ΔH of the thermochromic coloring color-memory compositions of Examples 9 to 15 are shown in the below-described table.

The parts by weight of the components (A), (B) and (C) are equal to those of Example 9 and color changes from blue to colorless.

TABLE 2

| | Component (C) | Thermochromic characteristic (° C.) | | | | | | |
|---|---|---|---|---|---|---|---|---|
| Ex | (Compound No.) | $T_1$ | $T_2$ | $T_3$ | $T_4$ | $T_H$ | $T_G$ | ΔH |
| 9 | (4) | 32.0 | 40.0 | 41.0 | 57.0 | 36.0 | 49.0 | 13.0 |
| 10 | (24) | 29.0 | 37.0 | 46.0 | 60.0 | 33.0 | 53.0 | 20.0 |
| 11 | (88) | 25.0 | 33.0 | 37.0 | 47.0 | 29.0 | 42.0 | 13.0 |
| 12 | (90) | 44.0 | 50.0 | 49.0 | 69.0 | 47.0 | 59.0 | 12.0 |
| 13 | (353) | 48.0 | 52.0 | 55.0 | 63.0 | 50.0 | 59.0 | 9.0 |
| 14 | (163) | 42.0 | 48.0 | 51.0 | 59.0 | 45.0 | 55.0 | 10.0 |
| 15 | (276) | 18.0 | 32.0 | 32.0 | 52.0 | 25.0 | 42.0 | 17.0 |

Example 16

Preparation Process of Thermochromic Coloring Color-Memory Microcapsule Pigment (Interfacial Polymerization Process)

A thermochromic coloring color-memory microcapsule pigment suspension was obtained by uniformly heat-dissolving a thermochromic coloring color-memory composition composed of 2.0 parts of 3-[2-ethoxy-4-(N-ethylanilino)phenyl]-3-(1-ethyl-2-methylindol-3-yl)-4-azaphthalide [Component (A)-B]] as the component (A), 6.0 parts of 1,1-bis(4-hydroxyphenyl)-2-methylpropane as the component (B) [Component (B)-a] and 50.0 parts of 4-(4-methylbenzyl)oxyphenylethyl decanoate as the component (C) [compound (4) of the component (C)], adding, to the resulting solution, a solution obtained as a wall membrane material by mixing 20.0 parts of an aromatic polyvalent isocyanate prepolymer and 50.0 parts of a co-solvent, emulsifying and dispersing the resulting mixture to form micro-droplets in a 6% aqueous polyvinyl alcohol solution, continuing stirring at 70° C. for about 1 hour, adding 2.5 parts of a water-soluble aliphatic amine to the reaction mixture and continuing stirring for further 6 hours.

By isolating the microcapsule pigment from the above-described microcapsule pigment suspension by centrifugal separation, a thermochromic coloring color-memory microcapsule pigment changing color from blue to colorless was obtained (average particle size: 3 μm).

Preparation of Measuring Sample

A measuring sample was prepared by adding 40 parts (solid content: 24 parts) of the thermochromic coloring color-memory microcapsule pigment to 60 parts of a water-based screen printing ink vehicle containing an ethylene-vinyl acetate emulsion as a binder resin, uniformly dispersing the resulting mixture to give a thermochromic coloring color-memory ink, and carrying out screen printing on a wood-free paper with the resulting ink.

Measuring Method of Hysteresis Characteristic

In a similar manner to Example 9, the hysteresis characteristic of the above-described thermochromic coloring color-memory microcapsule pigment was measured.

Examples 17 to 26

In a similar manner to Example 16, the thermochromic coloring color-memory compositions composed of the components (A), (B) and (C) as shown in the below-described table were encapsulated in microcapsules to prepare thermochromic coloring color-memory microcapsule pigments and their hysteresis characteristic was measured as in Example 16.

The components (A), (B) and (C) of the thermochromic coloring color-memory compositions encapsulated in the microcapsule pigments of Examples 16 to 26, their amounts, and the average particle sizes of the capsules are shown in the following table.

TABLE 3

| | Component (A) | | Component (B) | | Component (C) | | Average particle |
|---|---|---|---|---|---|---|---|
| Ex. | | Amount | | Amount | (Compound No.) | Amount | size (μm) |
| 16 | B | 2 parts | a | 6 parts | (4) | 50 parts | 3 |
| 17 | C | 2 parts | a | 6 parts | (4) | 50 parts | 2 |
| 18 | A | 1 part | a | 6 parts | (24) | 50 parts | 3 |
| 19 | A | 1 part | a | 6 parts | (12) | 50 parts | 3 |
| 20 | A | 1 part | a | 6 parts | (15) | 50 parts | 3 |
| 21 | A | 1 part | a | 6 parts | (35) | 50 parts | 3 |
| 22 | A | 1 part | a | 6 parts | (90) | 50 parts | 3 |
| 23 | C | 2 parts | a | 6 parts | (90) | 50 parts | 4 |
| 24 | B | 2 parts | a | 6 parts | (353) | 50 parts | 3 |
| 25 | A | 1 part | a | 6 parts | (377) | 50 parts | 3 |
| 26 | B | 3 parts | b | 2 parts | (345) | 50 parts | 2 |
| | | | c | 6 parts | | | |

The color changes and $T_1$, $T_2$, $T_3$, $T_4$, $T_H$, $T_G$ and ΔH of the microcapsule pigments obtained in Examples 16 to 26 are shown in the following table.

TABLE 4

| | Color change (colored → | Thermochromic characteristic (° C.) | | | | | | |
|---|---|---|---|---|---|---|---|---|
| Ex. | decolored) | $T_1$ | $T_2$ | $T_3$ | $T_4$ | $T_H$ | $T_G$ | ΔH |
| 16 | Blue → Colorless | −8.0 | 8.0 | 31.0 | 59.0 | 0 | 45.0 | 45.0 |
| 17 | Pink → Colorless | −6.0 | 2.0 | 34.0 | 58.0 | −2.0 | 46.0 | 48.0 |
| 18 | Blue → Colorless | −7.0 | 5.0 | 43.0 | 55.0 | −1.0 | 49.0 | 50.0 |
| 19 | Blue → Colorless | 16.0 | 26.0 | 43.0 | 49.0 | 21.0 | 46.0 | 25.0 |
| 20 | Blue → Colorless | 4.0 | 14.0 | 23.0 | 35.0 | 9.0 | 29.0 | 20.0 |
| 21 | Blue → Colorless | 20.0 | 40.0 | 44.0 | 60.0 | 30.0 | 52.0 | 22.0 |
| 22 | Blue → Colorless | 2.0 | 10.0 | 47.0 | 63.0 | 6.0 | 55.0 | 49.0 |
| 23 | Pink → Colorless | 4.0 | 12.0 | 44.0 | 62.0 | 8.0 | 53.0 | 45.0 |
| 24 | Blue → Colorless | 37.0 | 45.0 | 43.0 | 59.0 | 41.0 | 51.0 | 10.0 |
| 25 | Blue → Colorless | 28.0 | 40.0 | 53.0 | 61.0 | 34.0 | 57.0 | 23.0 |
| 26 | Blue → Colorless | −18.0 | −10.0 | 42.0 | 58.0 | −14.0 | 50.0 | 64.0 |

Example 27

Preparation Process of Thermochromic Coloring Color-Memory Microcapsule Pigment (In Situ Polymerization Process)

A primary suspension of a thermochromic coloring color-memory microcapsule pigment suspension was obtained by uniformly heat-dissolving a thermochromic coloring color-memory composition composed of 2.0 parts of 3-[2-ethoxy-4-(N-ethylanilino)phenyl]-3-(1-ethyl-2-methylindol-3-yl)-4-azaphthalide as the component (A) [component (A)-B], 6.0 parts of 1,1-bis(4-hydroxyphenyl)-2-methylpropane as the component (B) [component (B)-a] and 50.0 parts of 2-phenylethyloxyphenylmethyl hexadecanoate as the component (C) [compound (141) of the component (C)], emulsifying and dispersing the resulting solution into micro-droplets in an aqueous solution of methyl vinyl ether-maleic anhydride copolymerized resin (10%)/sodium hydroxide (2%), adding, as a wall membrane material, a solution obtained by uniformly heat-dissolving 8 parts of melamine and 20 parts of a 37% aqueous formaldehyde solution, and continuing stirring at 80° C. for about 3 hours.

A suspension of a thermochromic coloring color-memory microcapsule pigment was obtained by re-dispersing a microcapsule pigment isolated from the above-described primary suspension of the microcapsule pigment by centrifugal separation in an aqueous solution of methyl vinyl ether—maleic anhydride copolymerized resin (10%) and sodium hydroxide (2%), adding a solution obtained by uniformly heat-dissolving 8 parts of melamine and 20 parts of a 37% aqueous formaldehyde solution, and continuing stirring at 80° C. for about 3 hours.

The resulting microcapsule pigment suspension was centrifuged to isolate the microcapsule pigment, whereby a thermochromic coloring color-memory microcapsule pigment changing color from blue to colorless was obtained (average particle size: 3 μm).

In a similar manner to that employed in Example 16, a measuring sample of the thermochromic coloring color-memory microcapsule pigment was prepared and its hysteresis characteristic was measured.

Examples 28 to 36

Thermochromic coloring color-memory compositions composed of the components (A), (B) and (C) as listed in the below-described table were encapsulated in microcapsules in a similar manner to that described in Example 27 to prepare thermochromic coloring color-memory microcapsule pigments of Examples 28 to 36. In a similar manner to Example 16, their hysteresis characteristics were measured.

The components (A), (B) and (C) and their amounts of the thermochromic coloring color-memory compositions to be encapsulated in the microcapsule pigments of Examples 27 to 36, and average particle size of the capsules are shown in the following table.

TABLE 5

| | Component (A) | | Component (B) | | Component (C) | | Average particle size |
|---|---|---|---|---|---|---|---|
| Ex. | | Amount | | Amount | | Amount | (μm) |
| 27 | B | 2 parts | a | 6 parts | (141) | 50 parts | 3 |
| 28 | A | 1 part | a | 6 parts | (163) | 50 parts | 4 |
| 29 | C | 2 parts | a | 6 parts | (163) | 50 parts | 2 |
| 30 | A | 1 part | a | 6 parts | (187) | 50 parts | 3 |
| 31 | A | 1 part | a | 6 parts | (276) | 50 parts | 3 |
| 32 | C | 2 parts | a | 6 parts | (276) | 50 parts | 2 |
| 33 | A | 1 part | a | 6 parts | (44) | 50 parts | 4 |
| 34 | C | 2 parts | a | 6 parts | (44) | 50 parts | 3 |
| 35 | A | 1 part | a | 6 parts | (417) | 50 parts | 2 |
| 36 | B | 2 parts | a | 6 parts | (322) | 50 parts | 3 |

Color change and $T_1$, $T_2$, $T_3$, $T_4$, $T_H$, $T_G$ and ΔH of the microcapsule pigments obtained in Examples 27 to 36 are shown in the following table.

TABLE 6

| Ex. | Color change (colored → decolored) | Discoloration characteristic (° C.) $T_1$ | $T_2$ | $T_3$ | $T_4$ | $T_H$ | $T_G$ | ΔH |
|---|---|---|---|---|---|---|---|---|
| 27 | Blue → Colorless | −14.0 | −2.0 | 21.0 | 33.0 | −8.0 | 27.0 | 35.0 |
| 28 | Blue → Colorless | 10.0 | 22.0 | 50.0 | 60.0 | 16.0 | 55.0 | 39.0 |
| 29 | Pink → Colorless | 12.0 | 24.0 | 46.0 | 58.0 | 18.0 | 52.0 | 34.0 |
| 30 | Blue → Colorless | 24.0 | 34.0 | 44.0 | 64.0 | 29.0 | 54.0 | 25.0 |
| 31 | Blue → Colorless | 8.0 | 14.0 | 32.0 | 50.0 | 11.0 | 41.0 | 30.0 |
| 32 | Pink → Colorless | 7.0 | 13.0 | 30.0 | 54.0 | 10.0 | 42.0 | 32.0 |
| 33 | Blue → Colorless | −12.0 | 2.0 | 28.0 | 40.0 | −5.0 | 34.0 | 39.0 |
| 34 | Pink → Colorless | −6.0 | 8.0 | 25.0 | 39.0 | 1.0 | 32.0 | 31.0 |
| 35 | Blue → Colorless | 26.0 | 40.0 | 36.0 | 48.0 | 33.0 | 42.0 | 9.0 |
| 36 | Blue → Colorless | −8.0 | 10.0 | 37.0 | 51.0 | 1.0 | 44.0 | 43.0 |

The compound C of the component (A) in the above table is the following compound.

C: 2-(Dibutylamino)-8-(dipentylamino)-4-methyl-spiro[5H-[1]benzopyrano[2,3-g]pyrimidin-5,1'(3',H)-isobenzofuran]-3-one The components (B)-b and (B)-c in the above table are the following compounds.

b: 1,1-bis(4-hydroxyphenyl)hexafluoropropane c: 1,1-bis(4-hydroxyphenyl)-1-phenylethane

Application Example 1

Preparation of a Thermochromic Coloring Color-Memory Ink

A thermochromic coloring color-memory ink composed of 5.5 parts of the thermochromic coloring color-memory microcapsule pigment prepared in Example 7, 0.33 part of xanthan gum, 10 parts of urea, 10 parts of glycerin, 0.6 part of a nonionic penetration improver, 0.1 parts of a modified silicone antifoaming agent, 0.2 part of an antiseptic and 73.27 parts of water was prepared.

Preparation of Writing Implement

A polypropylene pipe having an inner diameter of 4.4 mm was filled by suction with 0.97 g of the thermochromic coloring color-memory ink (which had been allowed to stand at room temperature after color development of the microcapsule pigment by cooling to −15° C. or lower) and connected, via a holder made of a resin, with a ball-point pen tip holding a 0.7 mm steel ball inside the tip.

Next, an ink follower (liquid plug) containing polybutene as a main component and having viscoelasticity was filled from the rear portion of the polypropylene pipe, and a tail plug was fitted in the rear portion of the pipe. A front axle body and a rear axle body were assembled, a cap was fitted, and then degassing treatment was carried out by centrifugation, whereby a thermochromic coloring color-memory ball-point pen was obtained.

The cap has, at the apex thereof, a rubber made of SEBS attached as a frictional body.

Using the resulting ball-point pen, a lack letter (handwriting) was formed by writing on a sheet of paper.

The above-described handwriting was black at room temperature (25° C.), but the letter discolored and became colorless when the letter was rubbed using the frictional body. This state was kept unless the sheet of paper was cooled to −15° C. or less.

When the paper was put in a refrigerator and cooled to −15° C. or less, the letter showed a discoloration into black again. Thus, the color changing behavior was reproduced in repetition.

Application Example 2

A thermochromic coloring color-memory ink was prepared by adding 40 parts (solid content: 24 parts) of the thermochromic coloring color-memory microcapsule pigment prepared in Example 18 to 60 parts of a water-based screen printing ink vehicle containing an ethylene-vinyl acetate emulsion as a binder resin and dispersing the former in the latter uniformly. By using the resulting thermochromic coloring color-memory ink, screen printing was conducted on the surface of a white polyester film (thickness: 25 μm) to dispose thereon a reversible thermochromic layer. A transparent polyester film (thickness: 16 μm) was then laminated on the layer to give a reversible thermochromic display.

The display thus obtained was cooled to −7° C. or less to cause complete color development of the reversible thermochromic into blue, and then a white reverse letter was formed by printing it by a thermal transfer printer (product number: S4870, manufactured by Showa Information Systems).

The white reverse letter can be visually recognized insofar as the display is kept at a temperature range of from 5° C. to 43° C.

The white reverse letter became invisible when the display was cooled to −7° C. or less again to completely cause color development of the reversible thermochromic layer into blue. It was therefore possible to carry out the white reverse letter forming operation in repetition by using the thermal transfer printer.

Application Example 3

A thermochromic coloring color-memory ink was prepared by adding 40 parts (solid content: 24 parts) of the thermochromic coloring color-memory microcapsule pigment prepared in Example 26 to 60 parts of a water-based screen printing ink vehicle containing an ethylene-vinyl acetate emulsion as a binder resin and dispersing the former in the latter uniformly. By using the resulting thermochromic coloring color-memory ink, screen printing was conducted on a white polyester film (thickness: 25 μm) to dispose thereon a reversible thermochromic layer. A transparent polyester film (thickness: 16 μm) was then laminated over the layer, whereby a thermochromic coloring color-memory display was obtained.

The display thus obtained was cooled to −18° C. or less to cause complete color development of the reversible thermochromic layer into blue, and then a white reverse letter was formed by printing it using a thermal transfer printer (product number: S4870, manufactured by Showa Information Systems).

The white reverse letter can be visually recognized insofar as the display is kept within a temperature range of from −10° C. to 42° C. Since the visual recognition of the letter can be maintained under normal using state, the history when the temperature reaches the low temperature region or high temperature region was used as an irreversibly detectable indicator.

Application Example 4

A thermochromic coloring color-memory ink composed of 27.0 parts (solid content: 16.2 parts) of the thermochromic coloring color-memory microcapsule pigment prepared in Example 22, 0.33 part of xanthan gum (shear thinning agent), 10 parts of urea, 10 parts of glycerin, 0.6 part of a nonionic penetration improver ("Nopco SW-WET-366", trade name; product of SAN NOPCO Limited), 0.1 part of a modified silicone antifoaming agent ("Nopco 8034", product of SAN NOPCO Limited), 0.2 part of a fungicide ("Proxel XL-2", trade name; product of Zeneca Inc.) and 51.77 parts of water was prepared.

Preparation of Writing Implement

A polypropylene pipe having an inner diameter of 4.4 mm was filled by suction with 0.97 g of the above-described thermochromic coloring color-memory ink (which had been allowed to stand at room temperature after color development of the microcapsule pigment by cooling to 2° C. or lower) and connected, via a holder made of a resin, with a ball-point pen tip holding a 0.7 mm steel ball inside the tip.

Next, an ink follower (liquid plug) containing polybutene as a main component and having viscoelasticity was filled from the rear portion of the polypropylene pipe, and a tail plug was fitted in the rear portion of the pipe. A front axle body and a rear axle body were assembled, a cap was fitted, and then degassing treatment was carried out by centrifugation, whereby a thermochromic coloring color-memory ball-point pen was obtained.

The cap has, at the apex thereof, a rubber made of SEBS attached as a frictional body.

Using the resulting ball-point pen, a blue letter (handwriting) was formed by writing on a sheet of paper.

The above-described handwriting was blue at room temperature (25° C.), but the letter discolored and became colorless when the letter was rubbed using the frictional body. This state was kept unless the sheet of paper was cooled to 10° C. or less.

When the paper was put in a refrigerator and cooled to 2° C. or less, the letter showed a discoloration into blue again. Thus, the color changing behavior was reproduced in repetition.

Application Example 5

After 22 parts (solid content: 13.2 parts) of the thermochromic coloring color-memory microcapsule pigment prepared in Example 32 were uniformly dispersed in a water based medium composed of 5 parts of glycerin, 1.0 part of a fungicide ("Proxel XL-2", trade name; product of Zeneca Inc.), 0.1 part of a silicone antifoaming agent ["SN defoamer 381", trade name; product of SAN NOPCO Limited] and 63.9 parts of water, 8 parts of a 5% aqueous solution of hydroxyethyl cellulose ["CELLOSIZE WP-090L", trade name of a water soluble polymer flocculant, product of Union Carbide Japan] were added to the resulting dispersion while stirring, whereby a thermochromic coloring color-memory ink having the microcapsule pigment suspended therein in a crudely coagulated state was prepared.

Preparation of Writing Implement

A fiber focusing ink occlusion body (porosity: about 80%) prepared by coating a polyester sliver with a synthetic resin film was impregnated with the resulting thermochromic coloring color-memory ink (which had been allowed to stand at room temperature after color development of the microcapsule pigment by cooling to 7° C. or less). The resulting body was housed in a barrel and assembled in such a manner that it contacted with a resin processed pen body of polyester fiber (porosity, about 50%) mounted on the front part of the barrel. A cap was then fitted thereto, whereby a thermochromic coloring color-memory marking pen was obtained.

The cap has, on the apex thereof, a silicone rubber mounted as a frictional body.

By drawing a line using the resulting marking pen on a letter printed on a sheet of paper, the letter was ornamented in pink.

The ornamented portion of the letter was pink at room temperature (25° C.), but it discolored and became colorless when rubbed using the frictional body. This state was kept unless the sheet of paper was cooled to 13° C. or less.

When the sheet of paper was cooled to 7° C. or less by putting it in a refrigerator, the ornamented portion showed a discoloration behavior into pink again. The discoloration behavior was reproduced repeatedly.

While the invention has been described in detail and with reference to specific embodiments thereof, it will be apparent to one skilled in the art that various changes and modifications can be made therein without departing from the scope thereof.

This application is based on Japanese patent application No. 2004-330064 filed on Nov. 15, 2004, Japanese patent application No. 2004-356016 filed on Dec. 8, 2004 the entire contents thereof being hereby incorporated by reference.

What is claimed is:

1. A thermochromic coloring color-memory composition comprising a homogeneous solubilized mixture of (A) an electron donative coloring organic compound, (B) an electron accepting compound and (C) a compound represented by the following formula (I) or the following formula (II) as a reaction medium which controls color reactions of the components (A) and (B):

(I)

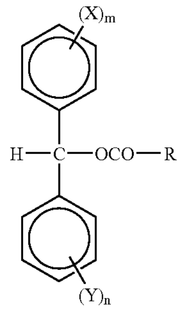

wherein, R represents an alkyl group or alkenyl group, having 8 or more carbon atoms, m and n each represents an integer of from 1 to 3, X and Y each represents a hydrogen atom, $C_{1-4}$ alkyl group, $C_{1-4}$ alkoxy group or halogen:

(II)

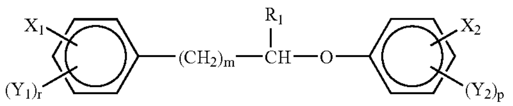

wherein, $R_1$ represents a hydrogen atom or methyl group, m represents an integer of from 0 to 2, either one of $X_1$ and $X_2$ represents $—(CH_2)_nOCOR_2$ or $—(CH_2)_nCOOR_2$ and the other one represents a hydrogen atom, n represents an integer of from 0 to 2, $R_2$ represents an alkyl or alkenyl group, having 4 or more carbon atoms, $Y_1$ and $Y_2$ each represents a hydrogen atom, $C_{1-4}$ alkyl group, methoxy group or halogen, r and p each represents an integer of from 1 to 3, with the proviso that a compound represented by the following formula (III) is excluded from the component (C):

(III)

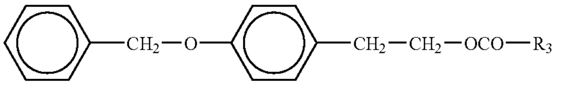

wherein $R_3$ represents an alkyl or alkenyl group, having 4 or more carbon atoms.

2. A thermochromic coloring color-memory microcapsule pigment comprising the thermochromic coloring color-memory composition of claim 1.

3. The thermochromic coloring color-memory microcapsule pigment according to claim 2, which discolors, showing a maximum hysteresis width of from 8° C. to 70° C. regarding a color density-temperature curve.

4. The thermochromic coloring color-memory microcapsule pigment according to claim 2, wherein the pigment has a complete decoloring temperature ($T_4$) of 40° C. or higher and a coloring starting temperature ($T_2$) of 20° C. or lower regarding the color density-temperature curve, and wherein said pigment has color-memory ability at the ordinary temperature range.

5. The thermochromic coloring color-memory microcapsule pigment according to claim 3, wherein the pigment has a complete decoloring temperature (T4) of 40° C. or higher and a coloring starting temperature (T2) of 20° C. or lower regarding the color density-temperature curve, and wherein said pigment has color-memory ability at the ordinary temperature range.

6. An ink composition for a writing implement, which comprises the thermochromic coloring color-memory microcapsule pigment according to any one of claims 2 to 4 or 5.

7. A writing implement which comprises the ink composition for a writing implement according to claim 6.

8. The writing implement according to claim 7, which comprises a frictional body.

* * * * *